United States Patent [19]
Maeda et al.

[11] Patent Number: 5,638,492
[45] Date of Patent: Jun. 10, 1997

[54] INFORMATION PROCESSING APPARATUS AND MONITORING APPARATUS

[75] Inventors: Akira Maeda, Yokohama; Motohisa Funabashi, Sagamihara; Hiromasa Yamaoka, Hitachi; Nobuyuki Fujikura, Ageo; Mikio Yoda, Ibaraki-ken; Mitsuo Yanagi, Takahagi; Toshihide Ichimori, Kawasaki, all of Japan

[73] Assignee: Hitachi, Ltd., Tokyo, Japan

[21] Appl. No.: 291,869

[22] Filed: Aug. 17, 1994

Related U.S. Application Data

[63] Continuation-in-part of Ser. No. 117,765, Sep. 8, 1993.

[30] Foreign Application Priority Data

Sep. 8, 1992 [JP] Japan ................................ 4-239258
Aug. 20, 1993 [JP] Japan ................................ 5-206143

[51] Int. Cl.$^6$ ...................................................... G06F 17/00
[52] U.S. Cl. ........................... 395/50; 395/51; 395/60; 395/61; 395/903
[58] Field of Search ...................... 364/422; 395/3, 395/10–11, 50, 51, 60–61, 900

[56] References Cited

U.S. PATENT DOCUMENTS 4,939,648  7/1990  O'Neil et al. ........................... 364/422
5,267,348  11/1993  Someya et al. ........................... 395/61

FOREIGN PATENT DOCUMENTS 036150  9/1981  European Pat. Off. ......... G06K 9/64
2-56602  2/1990  Japan ........................... G05B 13/00

OTHER PUBLICATIONS

Automobile Technique, vol. 46, No. 5, pp. 100–104.

Hitachi Review, vol. 72, No. 11, Nov. 1990, "Decision Support Expert System for Financial Transactions", Shigemi et al, pp. 51–56.

"Automatic Exposure Metering by Differential Vector Quantization", IBM Technical Dislosure Bulletin, vol. 33, No. 3B, Aug. 1990, pp. 75–76.

W. Brockmann, "Decision Making in Rule–Based Real–Time Systems", Automatisierungstechnik, vol. 39, No. 9, Sep. 1991, pp. 310–316.

*Primary Examiner*—Tariq R. Hafiz
*Attorney, Agent, or Firm*—Fay, Sharpe, Beall, Fagan, Minnich & McKee

[57] ABSTRACT

An information processing apparatus is capable of achieving high-level functions such as high-speed processing and learning without requiring a complex algorithm based on, for example, knowledge processing. A plurality of sets of known input data and correct output data corresponding thereto are beforehand stored. The stored input data is called response pattern data. Data actually inputted in the system operation is supplied to the plural sets of data. For each set of data, the input data is compared with the response pattern data to evaluate a distance (degree of similarity) therebetween. Results of evaluations for the respective sets of data are combined with the associated output data, for example, according to weighted average values on the basis of the evaluated distance, thereby generating final outputs.

9 Claims, 26 Drawing Sheets

| 1101 | 1102 | 1103 | 1104 | 1105 | 1106 |
|---|---|---|---|---|---|
| MEMORY CELL NUMBER | USE FLAG | EXCEPTION FLAG | RESPONSE PATTERN DATA | OUTPUT DATA | REFERENCED TIMES |
| 1001 | 1 | 0 | (42,35,*,*,20) | (367,29) | 21 |
| 1002 | 1 | 0 | (62,15,48,120,*) | (250,*) | 128 |
| 1003 | 0 | 0 | | | 0 |
| 1004 | 1 | 0 | (115,20,*,28,36) | (192,53) | 26 |
| 1005 | 0 | 1 | | | 0 |
| | | | | | 0 |
| 1064 | 1 | 1 | (160,64,90,180,72) | (0,0) | 1 |

F I G. 15
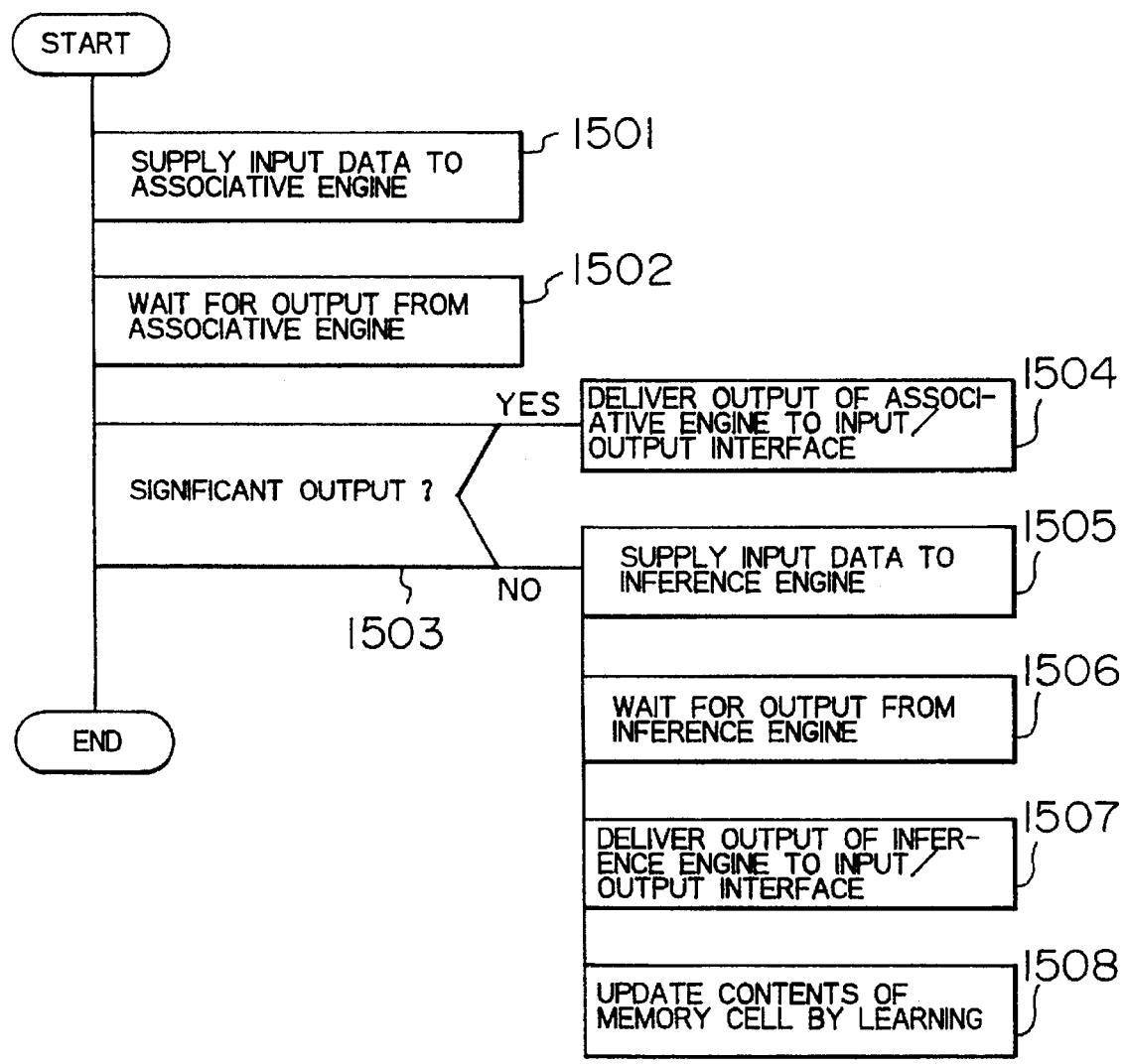

FIG. 16

```
No.309 CHART:MOVING AVERAGE LINE
   if  BULL-ORDER( 0)
       BULL-ORDER(-1)
       MAa( 0) ≥ MAa(-1) FUZZY(0.03)
       MAb( 0) ≥ MAb(-1) FUZZY(0.03)
       MAc( 0) ≥ MAc(-1) FUZZY(0.03)
       MAd( 0) ≥ MAd(-1) FUZZY(0.03)
 then PREDICTION:  0.00-0.10(0.5)
       MESSAGE : BULL-TREND
```

REMARKS : MAa, MAb, MAc, MAd, : A MOVING AVERAGE LINE OF FOUR LINES WITH DIFFERENT AVERAGE PERIODS. THE AVERAGE PERIOD OF MAa IS THE SHORTEST.

MAa( 0), MAa(-1) : 0 INDICATES A REFERENCE TIME, AND -1 ONE TIME BEFORE.

≥, FUZZY(0.03) : A MEMBERSHIP FUNCTION OF A FUZZY SET IS DETERMINED BY AN OPERATOR (≥) AND A PARAMETER (0.03).

BULL-ORDER : AN EXAMPLE OF A PATTERN NAME WHICH REFERS TO AN EVENT DEFINED BY ANOTHER RULE.

FIG. 22

| | MATERIAL COMPOSITION 1 | MATERIAL COMPOSITION 2 | ... | MATERIAL COMPOSITION Nr | CHARACTERISTIC VALUE 1 | CHARACTERISTIC VALUE 2 | ... | CHARACTERISTIC VALUE Nt |
|---|---|---|---|---|---|---|---|---|
| INSTANCE 1 | | | | | | | | |
| INSTANCE 2 | | | | | | | | |
| INSTANCE 3 | | | | | | | | |
| INSTANCE 4 | | | | | | | | |
| ... | | | | | | | | |
| INSTANCE Ns | | | | | | | | |

INFORMATION PROCESSING APPARATUS AND MONITORING APPARATUS

CROSS-REFERENCE TO RELATED APPLICATION

The present application is a continuation-in-part of U.S. patent application Ser. No. 08/117,765 filed Sep. 8, 1993.

BACKGROUND OF THE INVENTION

The present invention relates to an information processing apparatus such as a controller and a pattern recognition apparatus for determining output data from input data, and more particularly to an information processing apparatus and an apparatus for monitoring a control system using the information processing apparatus which stores plural sets of input/output data and determines outputs based on the sets to facilitate designing as well as realize high speed processing and advanced functions such as learning.

In conventional control apparatuses, methods of determining outputs from inputs may be roughly classified into:

(1) A method which uses mathematical models (prior art 1).

(2) A method which uses so-called knowledge processing techniques such as fuzzy reasoning and neural networks (prior art 2).

An example of engine control is described, for example, in a literature entitled "Improvement in Shift Timing by Fuzzy Logic" by Atsushi Hirako et al, in Automobile Technique, Vol. 46, No. 5, pp. 100–104.

(3) A method which uses lookup tables (prior art 3).

Many prior art examples are also known in regard to pattern recognition apparatuses which may be roughly classified into the following two kinds:

(4) A method which uses characteristic values of objects to design a recognition algorithm for each object (prior art 4); and (5) A method which uses a learning function such as neural networks (prior art 5).

A prior art technique closest to the present invention may be that described in JP-A-2-56602, entitled "Fuzzy Reasoning Apparatus" (prior art 6). This is a technique similar to the prior art 3 which performs controls using lookup tables.

The concept of this known example will be explained below. When an input/output relation is to be represented using fuzzy reasoning in applications to control, recognition and so on, if dedicated hardware is used in order to speed up operations such as calculations of membership function values and composition of fuzzy rules, which are executed every time the reasoning is performed, the circuit scale of the hardware will be extremely extended when the number of input data items and the number of fuzzy rules are increased. To solve this problem, this known example has all possible input/output relations previously stored in a memory, since if a value of input data is determined, the value of output data is uniformly determined also in fuzzy reasoning. For example, when there are two input data items which are each represented by an 8-bit integer value, the values of the input data are regarded as an address having 16 bits, and output values derived by the fuzzy reasoning corresponding to respective input values given as addresses are stored in a memory having a capacity of 65,536 ($=2^{16}$) words. In this manner, all operations required for the fuzzy reasoning can be executed by replacing the operations with the addressing of memory.

When the number of input data items is further increased, the known example describes employment of a method which utilizes an auxiliary storage unit to store the additional input/output relations for increased input data items by using, so to speak, a virtual storing method; and a method which connects the above-stated configuration in multiple layers, for example, if the number of input data items is four, this method connects configurations of two-inputs/one-output in two stages.

In any case, the configuration of this known example is equivalent to a system which implements the method using lookup tables with hardware, from a view-point that an input data value is converted to an address to derive an output which has previously been stored in that address in a memory.

SUMMARY OF THE INVENTION

The prior art 1 for controllers is supported by many theories such as traditional control theory and advanced control theory, and has been widely put to practical use. However, the prior art 1 implies a problem that these theories cannot be applied to an object which is so complicated that no mathematical model can be composed. Also, even if mathematical models can be theoretically composed, actual composition of hardware requires theoretical knowledge so that a designer highly skilled in the art is essential for designing a complicated control system. Further, if the characteristics of a control object vary in time, a model must be built which can follow such variations, which however is more difficult to be realized. In fact, such time-varying models have not been put to practical use except for exceptional cases.

The prior art 2, which is intended to solve part of the above-stated problems, can build a control system utilizing human experts knowledge or using a learning function of the neural networks even if the composition of mathematical models is extremely difficult. Nevertheless, these techniques, although not mathematically rigorous largely depend on designers' know-how with respect to how to acquire human experts knowledge and represent it in a computer processible form; how to collect data for learning in the case of neural networks; how to determine the structure of neural networks; how to select parameters necessary to execute the learning; and so on. Consequently, the number of designers who are capable of designing control systems using these techniques is quite limited, and moreover the designers themselves require much time to design such complicated control systems, thereby incurring an increased cost for designing control systems.

While the prior art 3 is characterized in that high speed processing is enabled with a relatively simple configuration, a majority of methods belonging to the prior art 3 are supposed to treat two or at most three input variables. If the number of input variables is increased beyond three, an immense memory capacity is required to store lookup tables. Particularly, with a built-in type controller, the provision of a memory having an extremely large capacity is very difficult to realize. For example, if five input variables are to be treated and their values are respectively represented in eight bits, the complete input data is represented by a total of 40 bits. Thus, for storing these data items in a lookup table, the memory requires a capacity of $2^{40}$, i.e., one tera words. For a built-in type controller, this is almost impossible to realize with respect to the cost. Since the number of input variables is increased as a system becomes more complicated, it is apparent that the simple lookup table-based system is applicable only to a limited range.

The prior art 4 relative to pattern recognition apparatuses implies a similar drawback to the controller stated above.

Specifically, determination of characteristic values required for a recognition, how to design a recognition algorithm, and so on basically belong to know-how, so that these problems can be treated only by designers highly skilled in the art. Also, even if such a recognition algorithm could be designed for a certain problem, completely different approaches would be necessary, for example, for speech recognition and character recognition. Thus, a different recognition algorithm must be designed for each individual object from the beginning, thereby presenting a remarkable problem of an increasingly enlarged cost of system development.

In contrast with the prior arts 1–4, the prior art 5, i.e., a method using a learning function, can theoretically avoid the problem of an enlarged cost of development and build a pattern recognition apparatus by preparing a number of sets (referred to as "teacher data") of an input pattern and an output corresponding thereto (recognition result), and then learning the relation between a different input pattern and an output corresponding thereto according to a previously defined learning procedure. However, when a pattern recognition apparatus is to be actually built, the prior art 5 also requires know-how about how to prepare teacher data; and how to determine a network structure and how to set a variety of parameters (a learning coefficient, a momentum coefficient, and so on) upon executing the learning in the case of neural networks. The fact is that the preparation of teacher data does not always permit a pattern recognition apparatus to be fully realized.

The prior art 6 essentially implements the prior art 3 with hardware so that a similar problem implied in the prior art 3 cannot be avoided with respect to the memory capacity. Even if an auxiliary storage unit is additionally employed, the prior art 6 cannot solve a similar problem, which becomes more serious as the number of input variables is increased. A method which reduces the capacity of memory by a multi-stage connection, as shown in JP-A-2-56602, apparently causes restrictions on expressible input/output relations. Specifically, supposing that four input variables are divided into two sets each including two variables, and input/output relations are represented by referencing two-stage tables, if all the input variables are represented in eight bits, three memories having a 64k-word capacity are sufficient to represent all the input/output relations. However, since the input variables have an information amount of 32 bits (4×8 bits), this method can merely represent an approximation of the input/output relations. This will be understood from the fact that part of the information provided by the input variables is lost at the time 16-bit input data of each set is converted to 8-bit data at the first stage of the lookup table reference in the method shown in JP-A-2-56602.

According to the method using the learning function of the prior art 5, it is necessary to prepare teacher data items sufficient for learning. Depending on the object problem, however, there may be a case in which the input or output may partly include a large number of missing values (unknown data items). In such a case, the conventional technologies use only the data free of the missing values. This leads to a problem as follows. The number of data items available for the learning is decreased. In a case where the data free of the missing values has a deviated distribution in the overall data, the learning itself is deviated. Consequently, the system performance thus attained as a result is deteriorated.

There exists a problem common to the prior art described above, namely, a satisfactory action cannot be taken when a portion of input information cannot be acquired due to a sensor failure or the like. In a pattern recognition using neural networks as an example of the prior art 5, when a portion of the input is unknown, there is generally adopted a method in which the unknown portion is replaced with an appropriate preset value (e.g., mean values). However, if the unknown input can be inferred according to a correlation between the unknown input and known inputs, it will be possible to effect a pattern recognition with a higher precision. This also applies to a case in which a portion of the input becomes unavailable due to, for example, a sensor failure in the control system. In the conventional technologies, however, existence of such missing values has not been fully taken into consideration and hence it is difficult to construct a system which copes with the missing value.

Also in a case where a system to monitor states of a plant is configured using the prior art 5, there occurs a problem related to collection of teacher data. That is, since there exist a considerably large number of failed states in a complex plant, it is practically impossible to prepare all sets of inputs and outputs associated with the failed states in advance. This consequently leads to a problem that a monitoring system to discriminate between the normal and failed states cannot be easily materialized using the learning function.

It is an object of the present invention to solve the problems of the prior art.

To solve the above-stated problems, the present invention has previously stored a plurality of sets of previously known input data (input data from sensors in the case of a controller, and characteristic value data of a pattern to be recognized in the case of a recognition apparatus) and correct output data corresponding to the input data (a manipulating amount as a control output in the case of a controller, and recognition results of a pattern in the case of a recognition apparatus). The previously provided input data is hereinafter called "response pattern data" for distinguishing it from actually inputted data. The response pattern data herein need not have all items of inputted data but may include partial information necessary to determine certain particular correct output data. For example, assume in pattern recognition that there are n characteristic values. A character may occasionally be determined if m (n>m) of the n characteristic values take particular values irrespective of the remaining (n−m) characteristic values. In this case, the response pattern data need not have all of the n characteristic values but may only have partial information, i.e., sets including m characteristic values.

Next, data inputted in an actual operation is provided to each of the plurality of sets. Then, the input data is compared with the response pattern in each set to evaluate the distance (degree of similarity) between the input data and the response pattern. Then, a final output is generated by composing the evaluation result for each set and output data in that set, for example, by a method which calculates weighted average values based on the evaluated distances.

BRIEF DESCRIPTION OF THE DRAWINGS

These and other objects and advantages of the present invention will become apparent by reference to the following description and accompanying drawings wherein:

FIG. 15 is a processing procedure flowchart showing the processing executed in an association process unit;

FIG. 16 shows an example of a rule for a technical analysis support system;

FIG. 22 is a diagram showing the configuration of an instance file 1904 of FIG. 19;

DESCRIPTION OF THE PREFERRED EMBODIMENTS

First, the principle of the present invention will be explained with reference to FIGS. 1 and 2.

Figure 1:
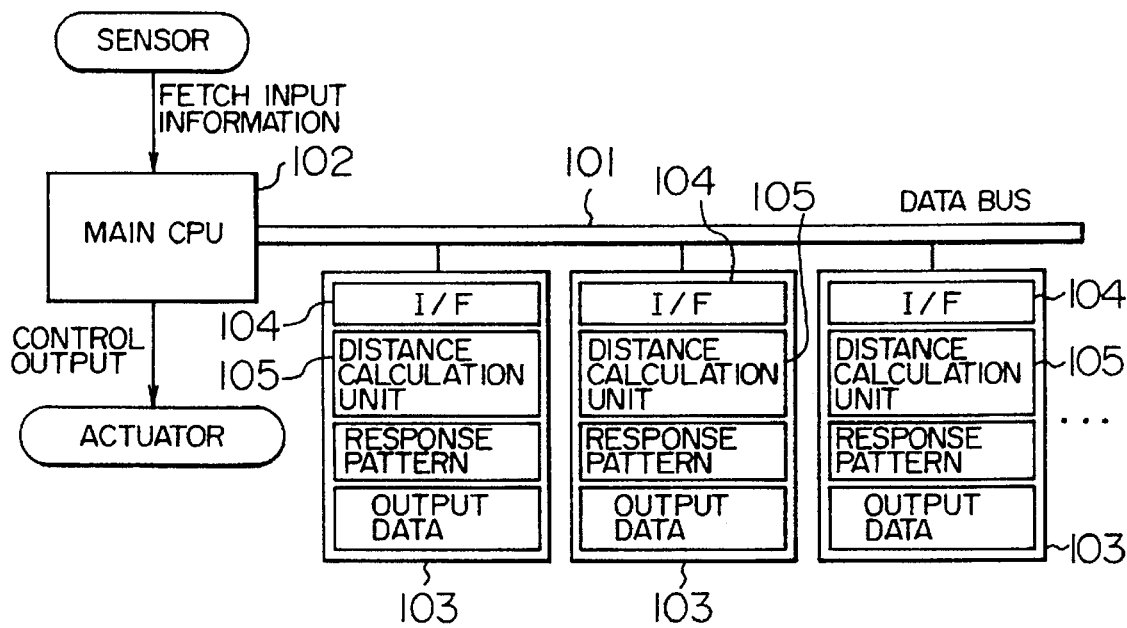
FIG. 1 is a block diagram showing the hardware configuration of an embodiment.

FIG. 1 is a block diagram showing the configuration of the present invention when implemented by hardware. The whole configuration comprises a data bus 101; a main CPU 102 connected to the data bus 101 for controlling all components arranged in the configuration; and a plurality of memory cells 103. Stored in each of the plurality of memory cells 103 is a set of a response pattern data and output data. Also, each of the memory cells 103 is provided with an interface unit 104 for interfacing with the data bus 101, and a distance calculation unit 105 for calculating the distance between input data and response pattern data.

The main CPU 102 first broadcasts input data to all of the memory cells 103 through the data bus 101. Each of the memory cells 103 receives the input data broadcasted from the main CPU 102, and the unit 105 calculates the distance between the received input data and response pattern data previously stored therein. Each of the memory cells 103 delivers output data based on the calculated distance through the interface unit 104 to the data bus 101. Then, the main CPU 102 collects output data from the respective memory cells 103 and composes a final output.

Figure 2:
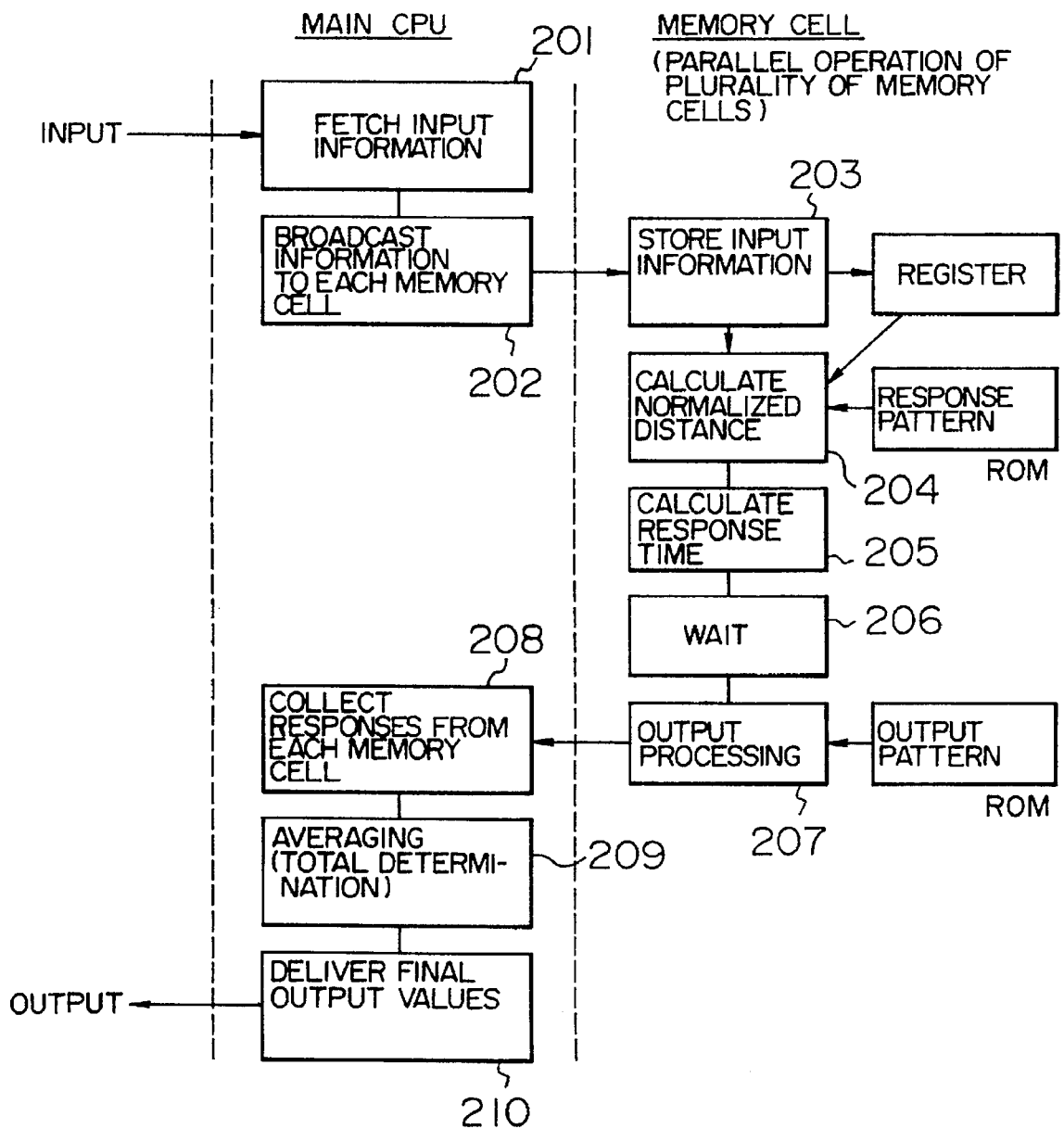
FIG. 2 shows a processing flowchart of the embodiment.

FIG. 2 is a flowchart showing a processing procedure in the above configuration.

First, at step 201, the main CPU 102 fetches input information which is broadcasted to the respective memory cells 103 at step 202.

In each of the memory cells 103, the data broadcasted at step 202 is temporarily stored at step 203 in a register provided in each memory cell 103. Then, the distance between the input data and response pattern data is calculated (by the distance calculation unit 105 shown in FIG. 1) at step 204.

Next, at step 205, a response time of each memory cell 103 is calculated in accordance with the calculated distance, and the processing is delayed by the calculated response time at step 206. Assume here that the response time is shorter as the distance is shorter. After the delay or wait at step 206, an output data is delivered onto the data bus 101 at step 207.

The main CPU 102 waits for responses from the respective memory cells 103 at step 208, and sequentially reads them as they arrive. In other words, the main CPU 102 sequentially reads output data corresponding to response pattern data closer to input data. At step 209, the output data read at step 208 are averaged in accordance with the distances thereof, and a final output value is derived at step 210.

In either case of a controller and a pattern recognition apparatus, considered as a problem is how to design a means for determining outputs from inputs. The present invention copes with this problem by storing a plurality of sets of input data (response pattern data) and output data, composed as described above, for determining an actual output for actual input data from output data corresponding to the response pattern data having distances close to the actual input data.

In this manner, when a complicated input/output relationship is represented by sets of response pattern data and output data, complicated theories and designing know-how are made unnecessary, thereby making it possible to solve the problem implied in the prior art methods 1, 2, 4 and 5, that the designing of apparatus is very difficult and causes an increase in developing cost.

Further, in comparison with a lookup table system which stores appropriate output data for all possible combinations of all input values, since the present invention determines a final output based on the distance between response pattern data and input data, fewer sets of response pattern data and output data may be stored for this determination, thereby saving a large part of the capacity of the storage unit. This effect will be further enhanced if partial information of input data is stored in the storage unit as response patterns.

Considering a special case where the output data is the response pattern data in the configuration above, when the input data partly includes missing values, it can be understood that there is configured a system for inferring the missing values based on known data.

Next, specific embodiments of the present invention will be explained with reference to FIGS. 3–32.

Figure 3:
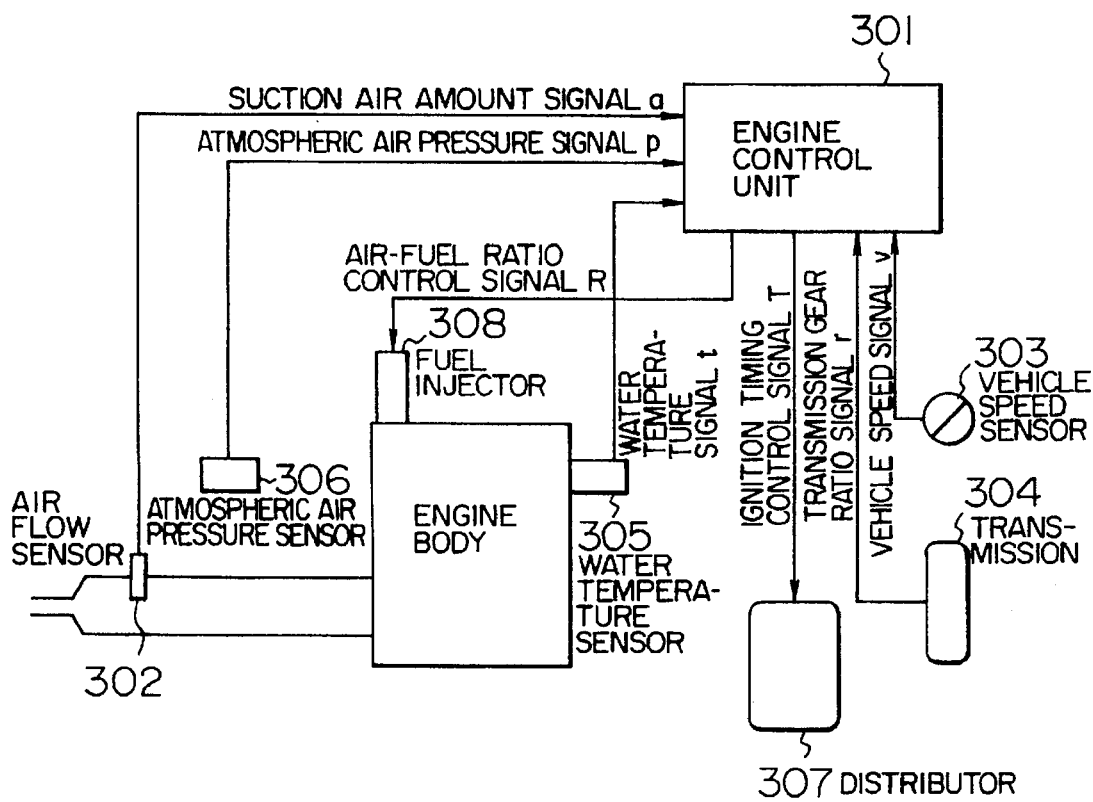
FIG. 3 is a block diagram showing the whole configuration of an engine control system.

FIG. 3 illustrates the whole configuration of an automobile engine control system which is a first embodiment of the present invention. An engine control unit 301 receives, as inputs, a suction air amount signal a from an air flow sensor 302; a vehicle speed signal v from a vehicle speed sensor 303; a transmission gear ratio signal r from a transmission 304; a water temperature signal t from a water temperature sensor 305; and an atmospheric air pressure signal p from an atmospheric air pressure sensor 306, and outputs an ignition timing control signal T to a distributer 307 and an air-fuel ratio control signal R to a fuel injector 308 in order to maintain amounts of torque and exhaust gas produced by an engine at appropriate values.

Figure 4:
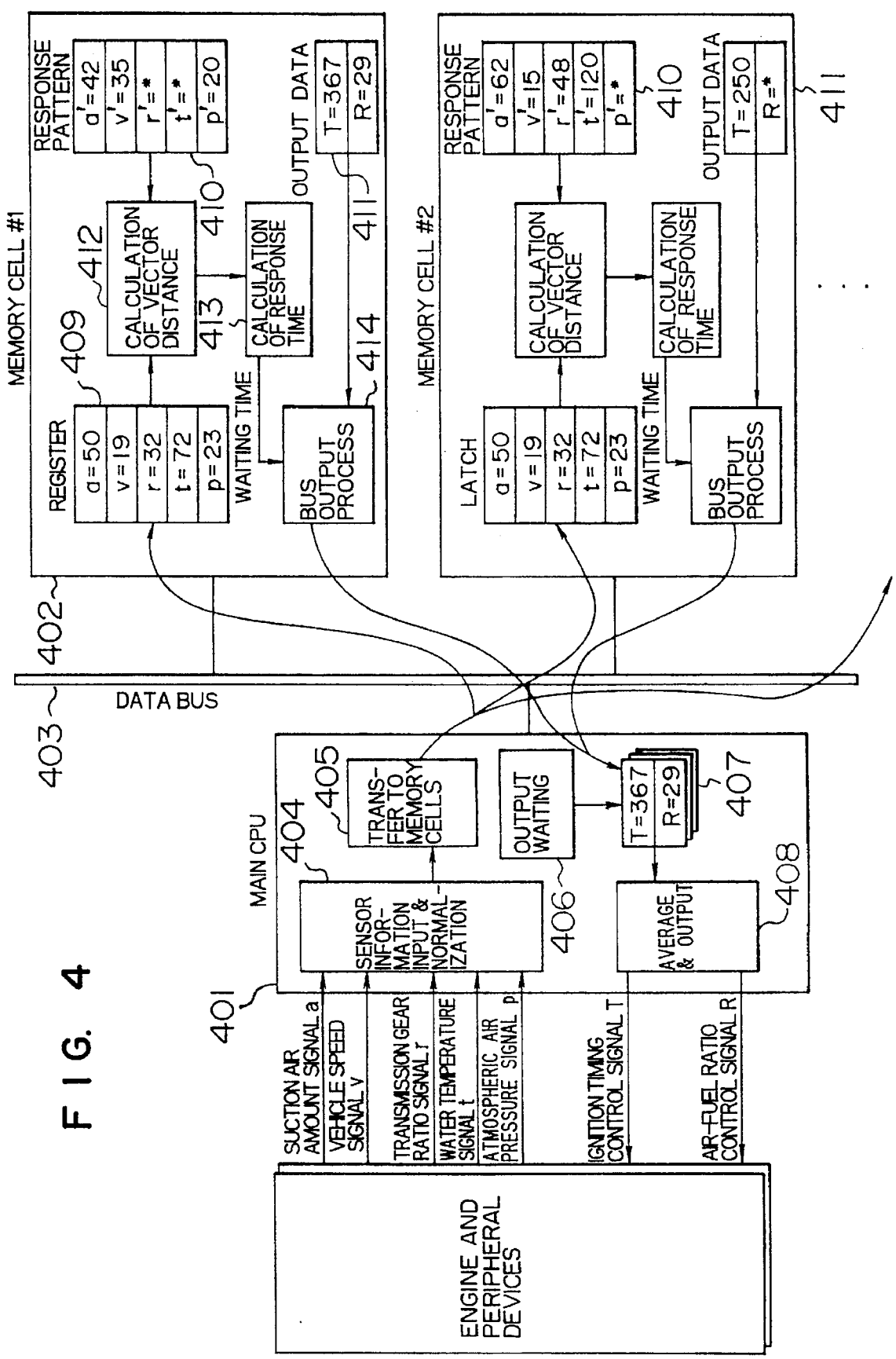
FIG. 4 is a block diagram showing the configuration of an engine control unit.

FIG. 4 illustrates in block form the internal configuration of the engine control unit 301 shown in FIG. 3. The engine control unit 301 is mainly composed of a main CPU 401 having functions of controlling operations of the whole unit and performing input/output interface with the outside; a plurality of memory cells 402 (for example, 1,024); and a data bus 403 for connecting them.

The main CPU 401 first reads the suction air amount signal a, vehicle speed signal v, transmission gear ratio signal r, water temperature signal t, and atmospheric air pressure signal p, which constitute inputs to the engine control unit 301, normalizes these signals if necessary, and temporarily stores them in a register arranged in the main CPU 401, as represented by a sensor information input process 404. For explanation, assume now that the signals are set to a=50, v=19, r=32, t=72, and p=23, respectively.

Next, the data stored in the register 405 is transferred to each of the plurality of memory cells 402, as represented by a data transfer process 405. This transfer is performed according to a broadcast method. Thereafter, the main CPU 401 waits for outputs from the memory cells, as represented by an output waiting process 406. At the time outputs are returned from the memory cells 402, the outputs from the memory cells are stored in an internal register 407 of the main CPU 401 in the output waiting process 406. This process is repeated until either of the following conditions is satisfied: outputs are derived from a predetermined number of memory cells; or the main CPU 401 waits for a predetermined time period.

Then, in an averaging and output process 408, outputs from the memory cells 402, which have been stored in the internal register 407, are averaged to determine final control outputs. The resultant outputs are supplied to the distributer 307 and the fuel injector 308. Assume here that the averaging is performed such that the final outputs are derived, for example, from three memory cells, wherein, supposing that the outputs from the memory cells are represented by Ti and Ri (i=1, 2, 3), resultant averaged values Tav and Rav are expressed by Tav=ΣTi/3 and Rav=ΣRi/3, respectively, where Σ represents a sum of Ti or Ri with i=1, 2, 3.

The operations inside the memory cells will be next explained. The operations in the respective memory cells are common and executed in parallel. Here, the operation in a memory cell #1 will be explained as an example.

Data transferred by the main CPU 401 by the data transfer process 405 is stored in the register 409 in the memory cell. The memory cell has stored in a register 410 response pattern data with which each memory cell should respond, and in a register 411 output data of the memory cell corresponding to the response pattern. The response pattern data basically includes amounts which represent states of objects in an engine control, while the output data corresponds to a control operation to be performed for individual states of the engine represented by the response pattern data.

A variety of methods may be considered as to how to determine a plurality of sets of the response pattern data and output data: for example, a method which employs a learning function to automatically determine the sets, as will be later explained in a second embodiment; a method which derives the sets converted from input/output relations described by another means such as fuzzy logic; and so on.

Assume that employed herein is a method which determines the sets simply using a clustering method. More specifically, a seven-dimensional vector is supposed which is a combination of five-dimensional response pattern data and two-dimensional output data, and a multiplicity of sets of the seven-dimensional vector can be utilized for simulations at a design stage and so on. In this event, since the number of the seven-dimensional vectors is generally immense, even if these could be stored as they are in memory cells, such storage would be extremely inefficient. Therefore, the seven-dimensional vectors are, for example, classified into 1,024 clusters by a proper clustering method, and representative values of the respective clusters are stored in the memory cells so that 1,024 sets of response pattern data—output data can be determined.

At the time data has been stored in the register 409, the distance between data in the register 409 and data in the register 410 is calculated in a vector form, as represented by a vector distance calculation process 412. In the example of FIG. 4, the five data consisting of the suction air amount signal a, vehicle speed signal v, transmission gear ratio signal r, water temperature signal t and atmospheric air pressure signal p, stored in the register 409, are regarded as a five-dimensional vector (a, v, r, t, p), while a response pattern stored in the register 410 is likewise regarded as a five-dimensional vector (a', v', r', t', p'), and the distance D between the two vectors is calculated as expressed by the following equation 1:

$$D=|a-a'|+|v-v'|+|r-r'|+|t-t'|+|p-p'| \tag{1}$$

Note however that when a special value indicated by "*" exists in the data stored in the register 410, this value is regarded to be one that has a distance equal to zero for any corresponding input value, that is, this value is regarded to be a "don't care" value, so that such items are omitted from the distance calculation of the equation 1. Specifically, in the example of the memory cell #1 shown in FIG. 4, since r'=* and t'=* are indicated, the distance D will be actually calculated by the following equation 2:

$$D=|a-a'|+|v-v'|+|p-p'| \tag{2}$$

In the example of the memory cell #1 shown in FIG. 4, where corresponding data in the register 409 are to be copied for data having the items set to the symbol "*" in the response pattern, substitutions of r'=r (=32) and t'=t (=72)

may of course be executed prior to the vector calculation process 412. The symbol "*" may be represented by a value which would never appear as a specific input value, for example, −1 (FFFF when denoted in 16-bit signed hexadecimal representation of integers).

Figure 5:
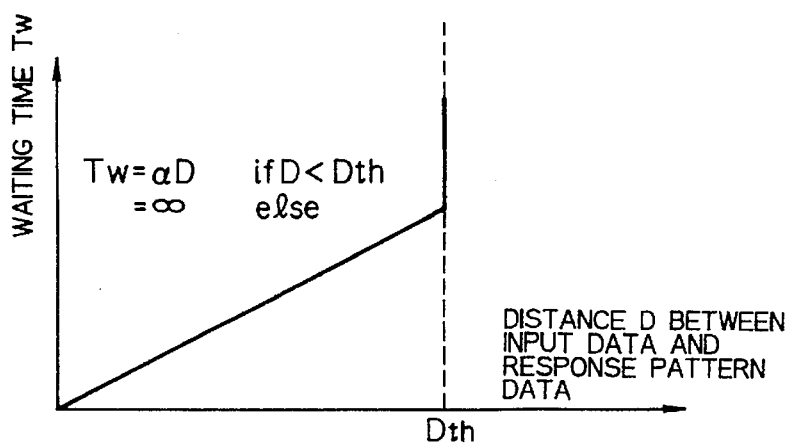
FIG. 5 is a graph representing a response time calculating function.

With the distance D calculated by the equation 1 or 2, a response time calculation process 413 calculates a waiting time Tw representing a time period which will elapse before each memory cell returns a response to the main CPU 401. This waiting time Tw is a monotonously increasing function of the distance D. FIG. 5 shows an example of the waiting time Tw. The example of FIG. 5 illustrates that the waiting time Tw linearly increases up to a threshold value Dth, and when the distance D exceeds the threshold value Dth, the waiting time becomes infinite, that is, no response is returned.

The waiting time Tw calculated in the response time calculation process 413 is delivered to a bus output process 414, where output data is sent onto the data bus 403 after the lapse of the waiting time Tw. In the example of the memory cell #1 shown in FIG. 4, the ignition timing control signal T=367 is outputted to the distributer 307, and the air-fuel ratio control signal R=29 is outputted to the injector 308.

The operations as described above are simultaneously executed in the plurality of memory cells. Data which indicate different values from one memory cell to another are only the response pattern data and the output data stored in the register 410 and 411, respectively.

With the configuration as described above, if response pattern data and output data corresponding thereto have been stored in a plurality of memory cells, the memory cell having the closest response pattern to arbitrary input data from sensors will provide output data with the shortest waiting time. Viewed from the main CPU 401, by reading output data from the memory cells in accordance with the responded time order without sequentially inquiring of all the memory cells, output data can be provided corresponding to the order in which the distance between input data and response pattern data is closer. Therefore, the present invention is advantageous in that even if the number of memory cells is increased, the time required to output data will hardly change so that a high speed control can be maintained irrespective of the number of memory cells. Incidentally, while the distance between input data and response pattern data is defined as the sum of an absolute value of the difference therebetween in the equation 1, this equation may of course be replaced with an ordinary distance defining equation which employs the sum of a square of the distance or the like.

In the foregoing example, the don't care value represented by "*" is permitted for the response pattern data. This don't care value is advantageous in that, upon storing sets of response pattern data—output data into the memory cells, the designation of values relative to unnecessary input data can be omitted when only partial sensor input information actually determines output data. Thus, the present invention is characterized in that a certain input/output relation can be expressed with a smaller number of sets of response pattern data—output data, i.e., with a smaller number of memory cells.

In addition, the don't care value may be permitted for the output data. In this case, treatment of the don't care value is determined by the main CPU 401. Specifically, in the foregoing averaging process, data signals having the don't care value may be excluded from the average value calculation. If all of Ti or Ri present the don't care value, predetermined default values may be outputted, or output values derived in the preceding control cycle may be stored such that the same values are again outputted.

While in the foregoing configuration, each set of response pattern data—output data is made to correspond to a distance calculation hardware unit, a plurality of sets of response pattern data—output data may be made to correspond to a single distance calculation hardware unit such that the single distance calculation hardware unit sequentially calculates the distances for the plurality of sets, thus reducing the amount of necessary hardware.

Figure 6:
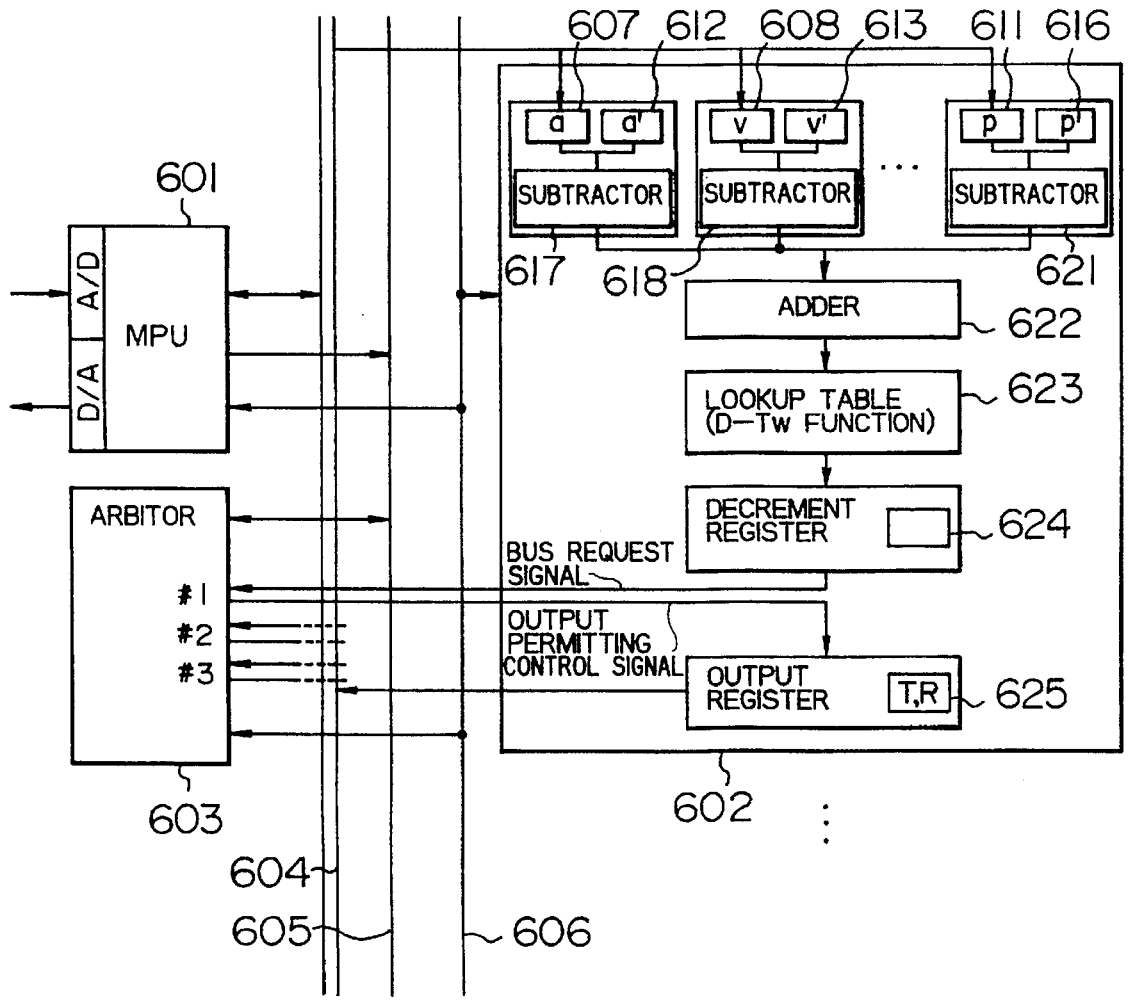
FIG. 6 is a block diagram showing the hardware configuration of the engine control unit.

FIG. 6 illustrates the configuration of the engine control unit shown in FIG. 4 when it is implemented by hardware.

Reference numeral 601 designates a microprocessor which implements the main CPU 401 in FIG. 4. The sensor information input process 404, data transfer to memory cells represented by the process 405, memory cell output waiting process 406, and output process 408 in FIG. 4 are executed in accordance with a program which has previously stored in a program memory provided in the microprocessor 601.

Reference numeral 602 designates memory cells corresponding to the memory cells 402 in FIG. 4, and 603 an arbitor for controlling the plurality of memory cells 602 so as to prevent a conflict from occurring when the plurality of memory cells 602 are going to simultaneously deliver data. The microprocessor 601, memory cells 602, and arbitor 603 are respectively connected to a data bus 604, a control signal line 605 and a clock signal line 606, so that each constituent element operates synchronously in accordance with a clock signal on the clock signal line 606.

The internal configuration of the memory cells 602 will be next explained. The register 409 in FIG. 4 corresponds to registers 607–611 in FIG. 6. The registers 607–611 are loaded with the sensor information $\underline{a}$, $\underline{v}$, $\underline{r}$, $\underline{t}$, $\underline{p}$, respectively, which have been broadcasted from the microprocessor 601 and read from the data bus 604 in accordance with a control signal on the control signal line 605.

Response pattern data a', v', r', t', p' have previously been stored in registers 612–616.

Subtractors 617–621 each execute subtraction between sensor information and response pattern data with respect to a corresponding information item and delivers the results to an adder 622. The adder 622 receives the results from the five subtractors as inputs and calculates the total sum D of their absolute values.

The function shown in FIG. 5 has previously been stored in a lookup table 623 as a table, such that the output D of the adder 622 is converted to a waiting time Tw by this lookup table 623. The output Tw of the lookup table 623 is stored in a decrement register 624 and is decremented by one per unit time.

When the contents of the decrement register 624 indicate zero, a control signal is transmitted to the arbitor 603. At the time an output permitting control signal is returned from the arbitor 603, output data previously stored in an output data register 625 is delivered onto the data bus 604.

Figure 7:
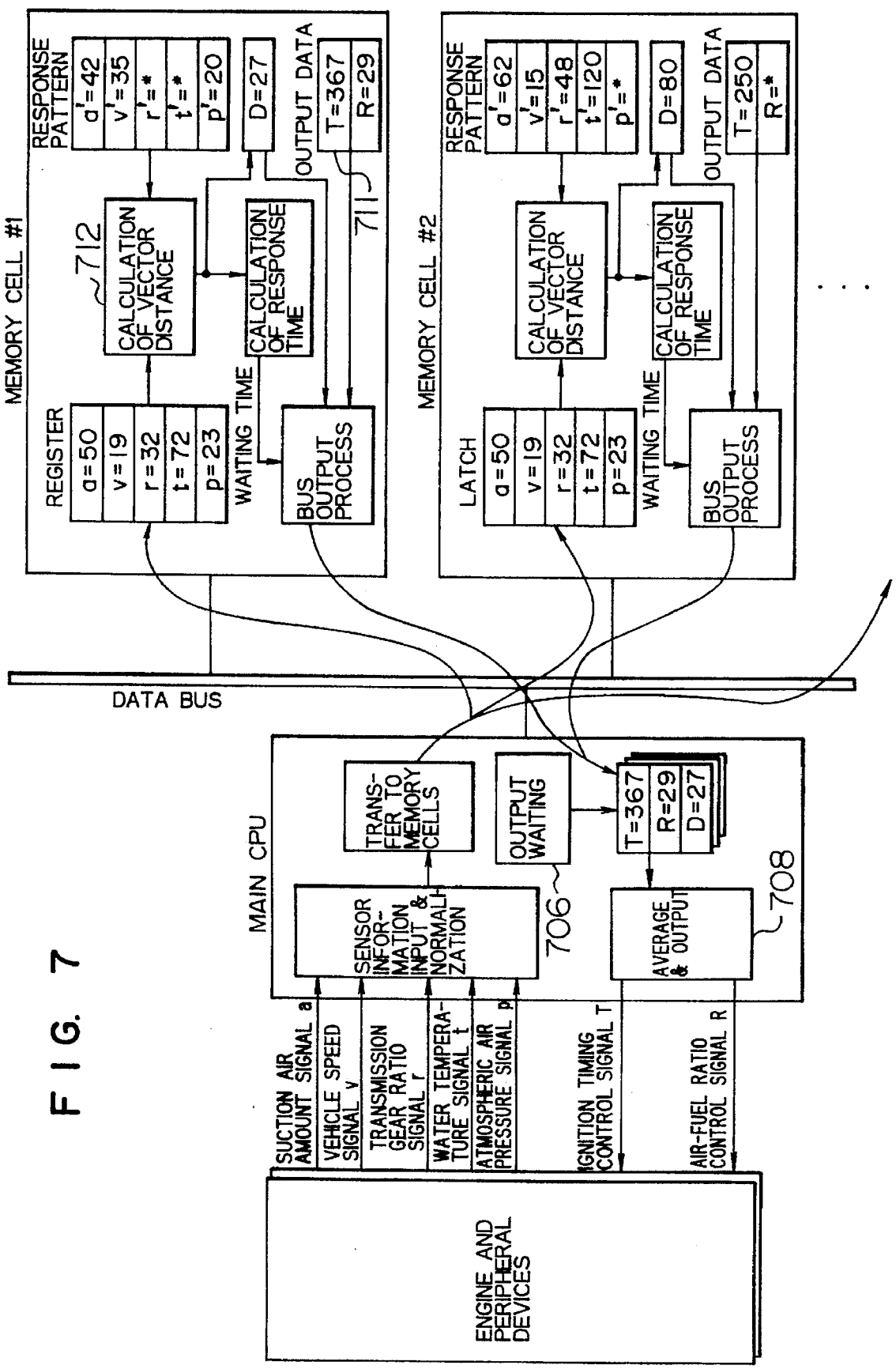
FIG. 7 is a block diagram showing the configuration of an alternative engine control unit.

FIG. 7 shows another method of implementing the engine control unit of FIG. 4.

The configuration of FIG. 7 differs from that of FIG. 4 in that, upon outputting data from each memory cell, the distance D between input data and a response pattern calculated in a vector distance calculation process 712 is delivered in addition to an output from a register 711.

In this event, the output data and distance data stored during an output waiting process 706 executed by the main CPU are used to calculate final outputs Tav, Ray in an averaging and output process 708 by the following relational equations:

$$Tav=\Sigma(Ti/Di)/\Sigma(1/Di)$$

$$Rav=\Sigma(Ri/Di)/\Sigma(1/Di)$$

These equations each correspond to a weighted average which is taken by use of a larger weight (specifically, in accordance with an inverse of the distance) for an output from a memory cell having response pattern data with a shorter distance, i.e., a higher degree of similarity relative to input data. (It should be noted however that if an ith memory cell exists which outputs a distance Di equal to zero, Ri and Ti are replaced with Rav and Tav, respectively (Rav=Ri, Tav=Ti).)

By thus calculating final outputs using weighted averages in accordance with the distance or degree of similarity, the accuracy of the averaging process can be improved, thereby making it possible to represent an input/output relation having a similar grade of accuracy with a less number of memory cells.

As described above, according to the first embodiment of the present invention, a plurality of sets of response pattern data and output data are stored, and a set having response pattern data close to inputted data can be derived at a high speed by a hardware configuration, so that a high speed control can be always accomplished even if a multiplicity of sets of response pattern data and output data are required.

Also, since final outputs are determined not only from the closest response pattern but also as weighted average values of output data corresponding to a plurality of response patterns, more accurate outputs can be provided. Further, when the response pattern data is made up of partial information of input data items, the number of sets of response pattern data—output data can be reduced without degrading the output accuracy.

While the hardware configuration illustrated in FIG. 6 shows that the memory cells are all connected to a single data bus, similar effects can also be produced when a hierarchical bus architecture or a ring bus architecture is employed as is well known in ordinary network connections.

Further, although the foregoing embodiment executes the calculation of the degree of similarity (distance) for data items stored in each memory cell according to one and the same procedure, the definition of the degree of similarity may be changed for each memory cell if employing, for example, a method which stores a different calculation algorithm for each memory cell in ROM or RAM (program memory) as a micro-program. Additionally, the contents of the table representing the relation between the distance and the waiting time may also be changed for each memory cell. In this case, a table may be set so as to allow memory cells having important sets of response pattern data—output data to preferentially respond, thereby providing more accurate outputs.

Figure 8:
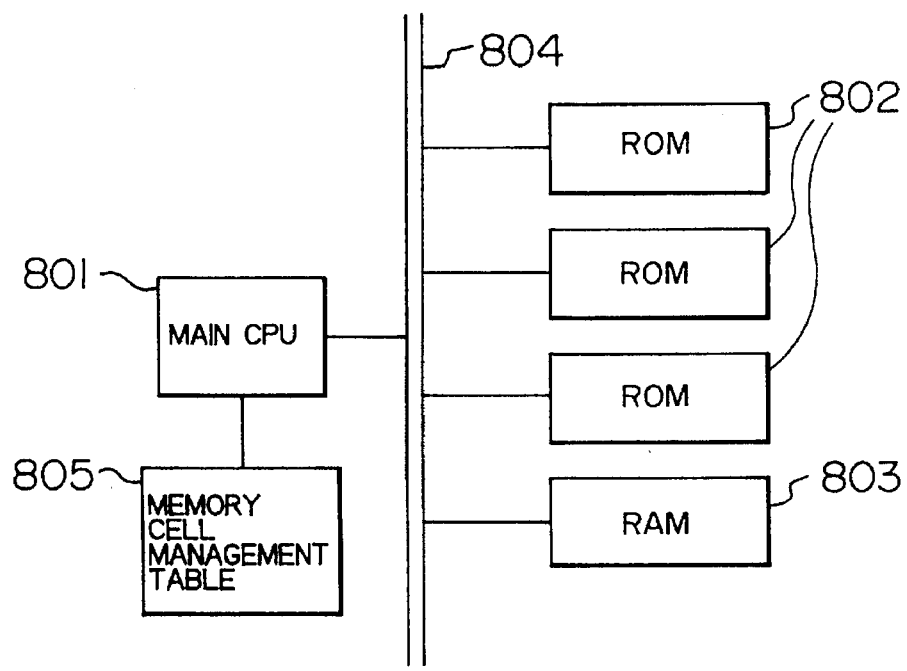
FIG. 8 is a block diagram showing the configuration of a learning type controller according to a second embodiment of the present invention.

FIG. 8 illustrates in block form the configuration of a learning-type controller according to a second embodiment of the present invention.

The learning-type controller according to the second embodiment comprises a main CPU 801; one or a plurality of ROM-type memory cell chips 802 and RAM-type memory cell chips 803; and an external bus 804 interconnecting these constituents.

The main CPU 801 executes input/output processing associated with the controller, management of execution mode/learning mode, later described, data transfer processing to the memory cell chips, and so on. Thus, the main CPU 801 has substantially the same roles as the main CPU 401 employed in the first embodiment in FIG. 4.

The memory cell chips 802 (ROM type) and 803 (RAM type) respectively implement a plurality of, for example, every 16 of integrated memory cells 402 shown in FIG. 4 as LSI chips. It should be noted however that, unlike the structure of the memory cell 402 in FIG. 4, the output data register 411 is assumed to have a memory cell number, not output data, stored therein. The main CPU 801 converts this memory cell number to output data using a memory cell management table 805, later described. The processing subsequent to this conversion is executed similarly to the first embodiment. The ROM-type memory cell chip 802 differs from the RAM-type memory cell chip 803 in that the former has a register 410 for storing response pattern data composed of a read only memory or ROM, while the latter is structured so as to be rewritable any time from the main CPU 801.

Figure 9:
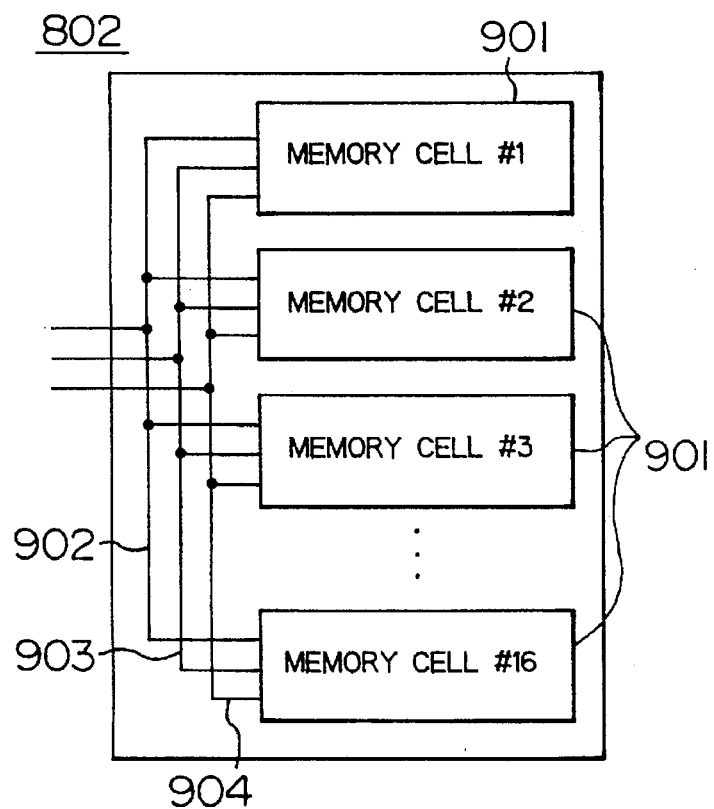
FIG. 9 shows the configuration of a ROM type memory cell chip.

FIG. 9 illustrates the internal configuration of the ROM-type memory cell chip 802.

Basically, the ROM-type memory cell chip 802 has 16 memory cells 103 (FIG. 1) integrated in one chip. Each of memory cells 901 contained in a chip is coupled to a data bus 902, a control signal line 903, and a clock signal line 904, all provided in the chip, while the respective signal lines are coupled to corresponding external signal lines, respectively.

Figures 10, 11:
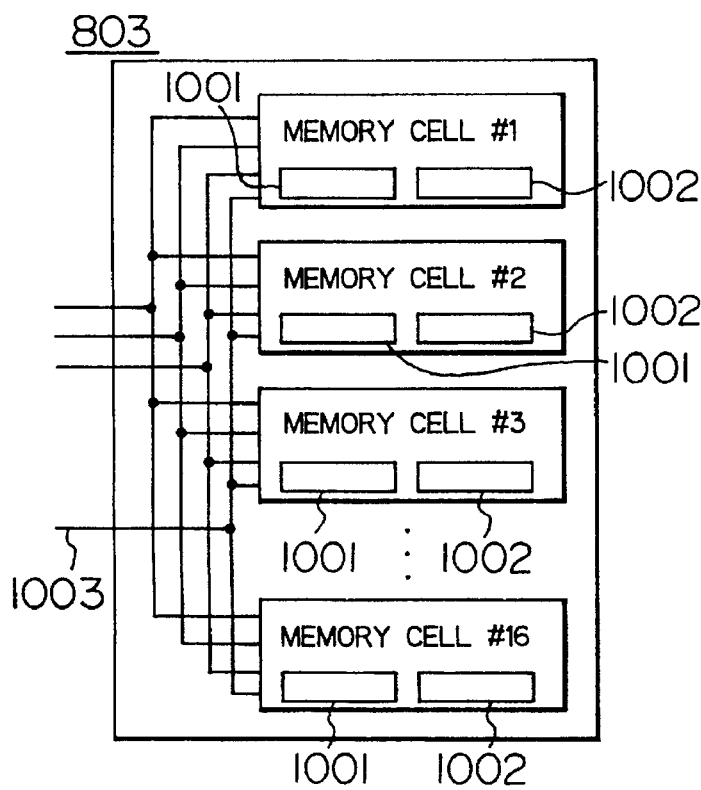
FIG. 10 shows the configuration of a RAM type memory cell chip.
FIG. 11 is a diagram showing the structure of a memory cell management table.

FIG. 10 illustrates the internal configuration of the RAM-type memory cell chip 803.

While the configuration presented by FIG. 10 is basically similar to that of the ROM-type memory cell chip 802 of FIG. 9, the former differs from the latter in that a register 1001 for storing response pattern data and a register 1002 for storing output data are composed of rewritable memories, and that the former is provided with an address signal line 1003 for specifying an address in a memory cell to be written, when the data to be stored is transferred from the main CPU 801.

In the configuration of FIG. 8, the operation is executed in the following two modes:

(1) Execution mode; and
(2) Learning mode.

When operating in the execution mode (1), the ROM-type memory cell chips 802 are treated equivalently to the RAM-type memory cell chips 803 so that these memory cell chips operate in a manner similar to that explained in connection with the first embodiment. The learning mode (2), which is peculiar to the present embodiment, will be explained below in detail. It is assumed here that, upon executing in the learning mode, the main CPU 801 is simultaneously supplied not only with input data but also with correct output data corresponding to the input data (which is called "teacher data").

Reference is first made to FIG. 11 which shows the structure of a memory cell management table used by the main CPU 801.

Each row of the table corresponds to a memory cell. A column 1101 indicates numbers given to memory cells contained in the RAM-type memory cell chips 803. It is assumed here that the memory cell numbers stored in the ROM-type memory cell chips 802 take values more than 1000, while the memory cell numbers stored in the RAM-type memory cell chips 803 take values in a range from 1 to 1000.

A column 1102 contains a use flag indicating whether a memory cell corresponding to a memory cell number stored in the column 1101 is actually in use. A column 1103 contains a value of an exception flag indicating whether the content of a memory cell corresponding to a row falls under exceptional events. A column 1104 contains response pattern data of a corresponding memory cell, and a column 1105 output data. A memory cell number outputted from a memory cell to the main CPU 802 in operation is converted to output data in accordance with the contents of the column 1105. A column 1106 contains the number of times the associated memory cell has been referenced.

Figure 12:
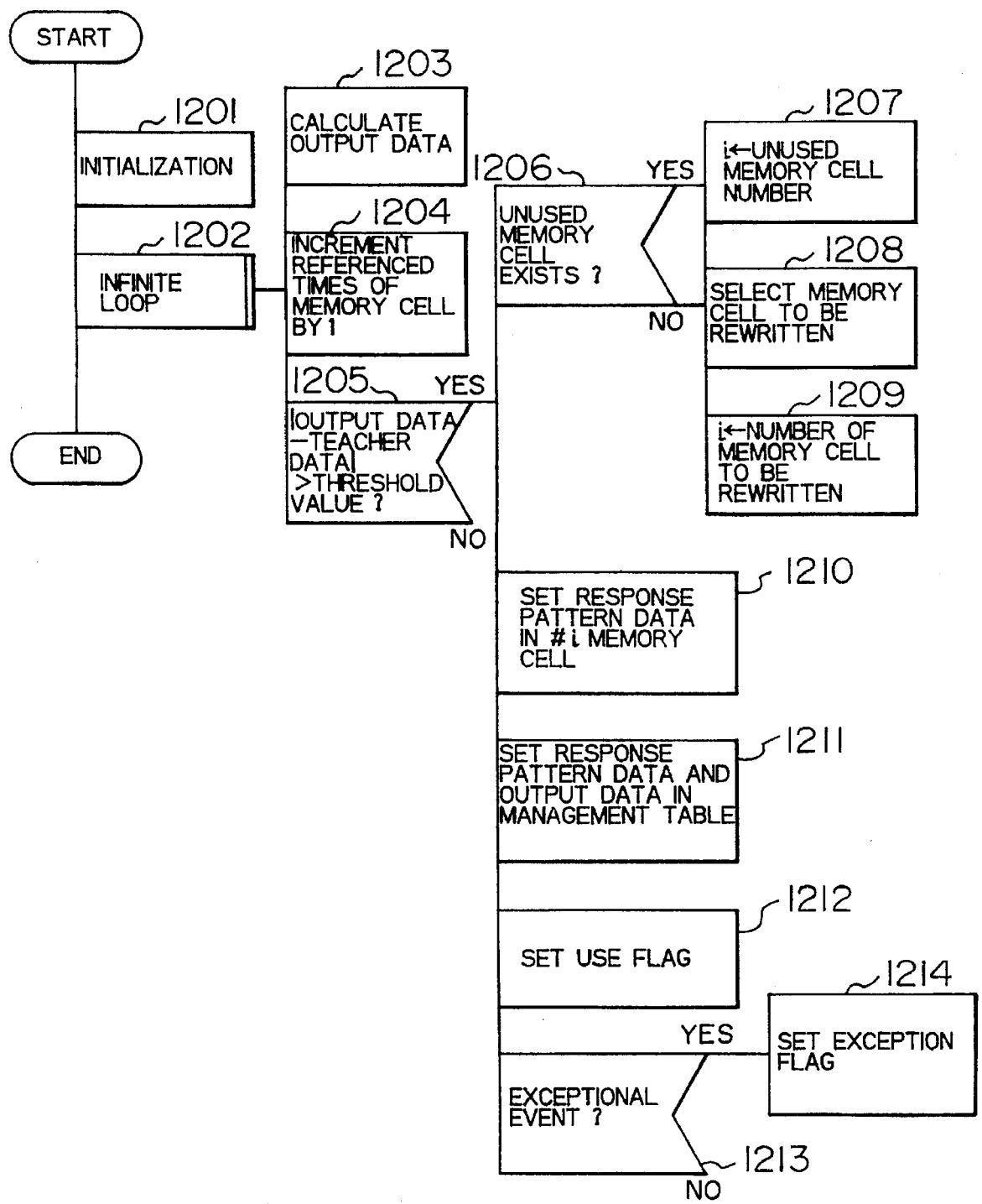
FIG. 12 shows a processing procedure flowchart of the learning type controller.

FIG. 12 shows a processing flow of the main CPU 801 in the learning mode. At step 1201, initialization is executed only when the learning mode is entered for the first time. This initialization process sequentially sets memory cell numbers stored in the RAM-type memory cell chips 803 shown in FIG. 8 into the column 1101 of the memory cell management table, and clears all the contents of the columns 1102, 1103 and 1106 to zero. Also, the contents of the response pattern register 1101 and the output data register 1102 stored in the RAM-type memory cells 803 of FIG. 8 are set to a value which would never appear as input data and output data, for example, −1 (FFFF in hexadecimal notation) in two-byte representation of integers. Likewise, values are set in the columns 1104 and 1105.

At step 1202, it is determined whether learning termination conditions are satisfied, and processes at steps 1203–1205 are repeated as long as the learning termination conditions are not satisfied.

At step 1203, output data is determined by a method similar to that explained in connection with the first embodiment, using data inputted when the learning mode operation is started as well as both of the ROM-type memory cell chips 802 and the RAM-type memory cell chips 803.

At step 1204, the contents of the column 1106 are incremented by one for a memory cell referenced at step 1203.

At step 1205, outputs calculated from outputs of memory cells, for example Rav and Tav in the case of the first embodiment, are compared with R'av and T'av given as teacher data, respectively. Then, the difference $E = |Rav - R'av|^{}2 + |Tav - T'av|^{}2$ is calculated. Next, the difference is compared with a predetermined threshold value θ, and if the difference E is equal to or larger than the threshold value, processes at and after step 1206 are executed, while the process at step 1203 is again executed if smaller.

At step 1206, the column 1102 in the memory cell management table of FIG. 11 is examined to see whether a memory cell currently not in use exists. If one exists, the learning is executed due to addition of the memory cell at step 1207. Otherwise, if no unused memory cell exists, processes at and after step 1208, i.e., the learning due to update of the contents of memory cells, are executed.

At step 1207, the number of the unused memory cell found at step 1206 is set to a variable $i$.

The processes at steps 1208 and 1209 are executed when no empty memory cell was found at step 1206. First, at step 1208, determination is made of a number of a memory cell, the contents of which are to be rewritten, within the memory cells contained in the RAM-type memory cell chips. In this embodiment, selected is the memory cell which has the value of the exception flag in the column 1103 set to zero and the number of referenced times stored in the column 1106 indicating the smallest value in the memory cell management table of FIG. 11. Other than the foregoing, a variety of methods can be considered for the selection of a memory cell to be rewritten, for example, a method which selects the memory cell that has not been referenced for the longest time period of all the memory cells.

At step 1209, the number of the memory cell, the contents of which are rewritten, as determined at step 1208, is set to the variable $i$.

At step 1210, the contents of the ith memory cell are replaced with those corresponding to current teacher data. In other words, the values of current input data are set to the response pattern register of the ith memory cell.

At step 1211, a search is made for a row which has the column 1101 set to the value equal to the variable $i$ in the management table of FIG. 11, and the values of the current input data are set to the column 1104 indicative of response pattern data, while the values of the teacher data R'av and T'av are set to the column 1105 in that row.

At step 1212, the use flag stored in the column 1102 of the row in the management table, which has the contents of the columns 1104 and 1105 rewritten at step 1211, is set to one.

At step 1213, current inputs are examined to see whether they belong to exceptional events. For attending to an exceptional input, the contents of the column 1103 are set to one at step 1214. The exceptional events called herein refer to those events which do not occur when the control is normally performed but may possibly occur when the control is deviated from a normal state by some cause, e.g., knocking, engine failure and so on in the example of engine control. In the learning mode, when these exceptional events have rarely occurred for a long time, the learning function could delete input/output relations relative to these exceptional events. To avoid such inconvenience, the present embodiment provides in the memory cell management table a flag indicating whether a current input is an exceptional event, so that input/output relations relative to such exceptional events are protected from being lost by the learning function. A variety of means may be used to determine whether an input falls under the exceptional event. In this embodiment, how to provide input and output data for the learning function is assumed to be wholly managed by an external control, so that information serving as bases to determine the exceptional events is also provided from the outside.

The foregoing processing is executed once or a plurality of times for input data and the teacher data, whereby the contents of the RAM-type memory cell chips can be organized by the learning.

As described above, the second embodiment of the present invention realizes the learning function as addition and replacement of memory cells. Alternatively, the learning may be realized by sequential modifications of the contents of memory cells. In this case, the following processing may be executed corresponding to the processes at and after step 1210 in FIG. 12.

The thinking of this processing lies in that the contents of, for example, three memory cells used to calculate the outputs Rav, Tar, that is, the contents of either or both of response pattern data and output data, are modified such that the output difference $E = |Rav - R'av|^{}2 + |Tav - T'av|^{}2$ becomes smaller. If a so-called method of steepest descent, which modifies both of the response pattern data and the input data in a direction in which the difference E most rapidly changes, is employed by way of example, the following procedure may be taken.

First, for output data Ri ($i=1,2,3$), the following equation is satisfied:

$$\partial E / \partial Ri = 2(Rav - R'av) \cdot \partial Rav / \partial Ri \quad (3)$$
$$= (1/Di)/\Sigma(1/Dj)$$

where Σ represents a sum of $1/Dj$ with $j=1, 2, 3$, so that modification of Ri may be performed in accordance with the following equations:

$$Ri \leftarrow Ri + \Delta Ri, \quad \Delta Ri = -\eta \cdot \partial E / \partial Ri \quad (4)$$

where η represents a constant called a learning coefficient for controlling a modification speed for Ri and is normally set to a fixed value approximately ranging from 0.01 to 0.2. Ti can also be modified in the same way completely.

Next, response pattern data (a'i, v'i, r'i, t'i, p'i) are modified in the following manner. Assuming that either of the five response pattern data items is represented by x'i, the output difference E depends on x'i only through the distance Di between response pattern data and input data, so that the following equations are satisfied:

$$\partial E/\partial x'i = \partial E/\partial Rav \cdot \partial Rav/\partial x'i + \partial E/\partial Tav \cdot \partial Tav/\partial x'i \quad (5)$$

$$\partial Rav/\partial x'i = \partial Rav/\partial(1/Di) \cdot (-1/Di^{**}2) \cdot \partial Di/\partial x'i \quad (6)$$

These equations are applicable to Tav in the same way completely. Further, from the following equation:

$$\partial E/\partial(1/Di) = 2(Rav - R'av) \cdot [Ri/\Sigma(1/Dj) - \Sigma Rj/(\Sigma(1/Dj)^{**}2)] \quad (7)$$

$\partial/\partial x'i$ can be derived when these equations are combined. Thus, the modification by the method of steepest descent can be performed by modifying each response pattern data with the following equation:

$$x'i \leftarrow x'i + \Delta x'i, \quad \Delta x'i = -\eta \cdot \partial E/\partial x'i \quad (8)$$

According to the second embodiment as described above, rewritable RAM-type memory cells are used to allow response pattern data and output data stored in the RAM-type memory cells to be added, replaced and modified so as to reduce the difference between teacher data and output data, thus making it possible to realize a learning-type controller which gradually improves the control accuracy.

Also, since a certain number (16 in the second embodiment) of memory cells are integrated in a single chip, addition of memory cells is greatly facilitated. Therefore, when the configuration of the present embodiment is employed, a wide range of systems from small scale one to large scale one can be realized by the same configuration, thereby providing a system which can flexibly attend to an increase in the number of memory cells due to design changes.

While the second embodiment described above is configured to make the contents of response pattern data and output data rewritable, another configuration may also be employed, wherein the distance calculation in FIG. 6 is executed by a general purpose microprocessor and a program instead of dedicated hardware, and a RAM is used to constitute a program memory containing the program, and the lookup table 622 shown in FIG. 6, so that the program and lookup table in the RAM are made rewritable by instructions of the main CPU. With such a configuration, the priority of outputs can be flexibly set for each memory cell from the main CPU, thereby making it possible to realize a more accurate controller.

This learning-type controller can of course be incorporated in an engine control system as described with respect to the first embodiment, and in more general home-use electric apparatuses such as an air conditioner, refrigerator, washing machine and so on, as a built-in controller. In this case, a user may provide correct values serving as teacher data to such a controller-incorporated system so that the system gradually modifies its control so as to comply with the user's usage and preference.

While the foregoing first and second embodiments of the present invention have been explained in connection with controllers, other information processing apparatuses for pattern recognition and so on may be regarded basically similar to the controller with respect to how to represent complicated input/output relations, so that the above described method of using sets of response pattern data— output data stored in memory cells may be applied to such information processing apparatuses in the same way completely.

Next, a third embodiment of the present invention will be explained with reference to FIGS. 13–16.

Figure 13:
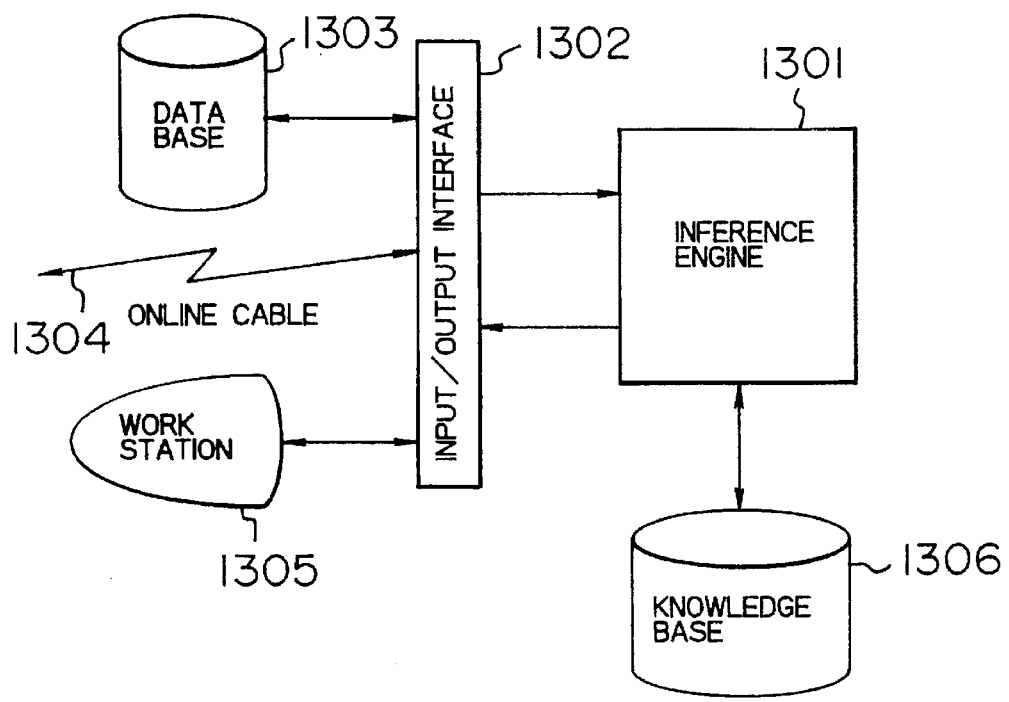
FIG. 13 is a block diagram showing the configuration of a knowledge processing system.

FIG. 13 illustrates the configuration of an ordinary knowledge processing system. An inference engine 1301, which is the core of a knowledge processing system, receives inputs from a database 1303, an on-line cable 1304, a work station 1305, and so on through an input/output interface 1302. The inference engine 1301 sequentially applies rules in an if-then form stored in a knowledge base 1306 to each inputted data (a value or symbol) to derive an output. The mechanism of this inference is described in detail in many well-known literature sources. The output of the inference engine 1301 is written into the database 1303, transmitted through the on-line cable 1304, displayed on the screen of the work station 1305, and used for other purposes through the input/output interface 1302. This processing is repeated each time new data is inputted.

A specific example of a system utilizing knowledge processing is described in detail, for example, in "Decision Support Expert System for Financial Transactions" by Hidekazu Shigemi et al, pp. 51–56 in Hitachi Review, Vol 72, No. 11 (Nov., 1990).

Figure 14:
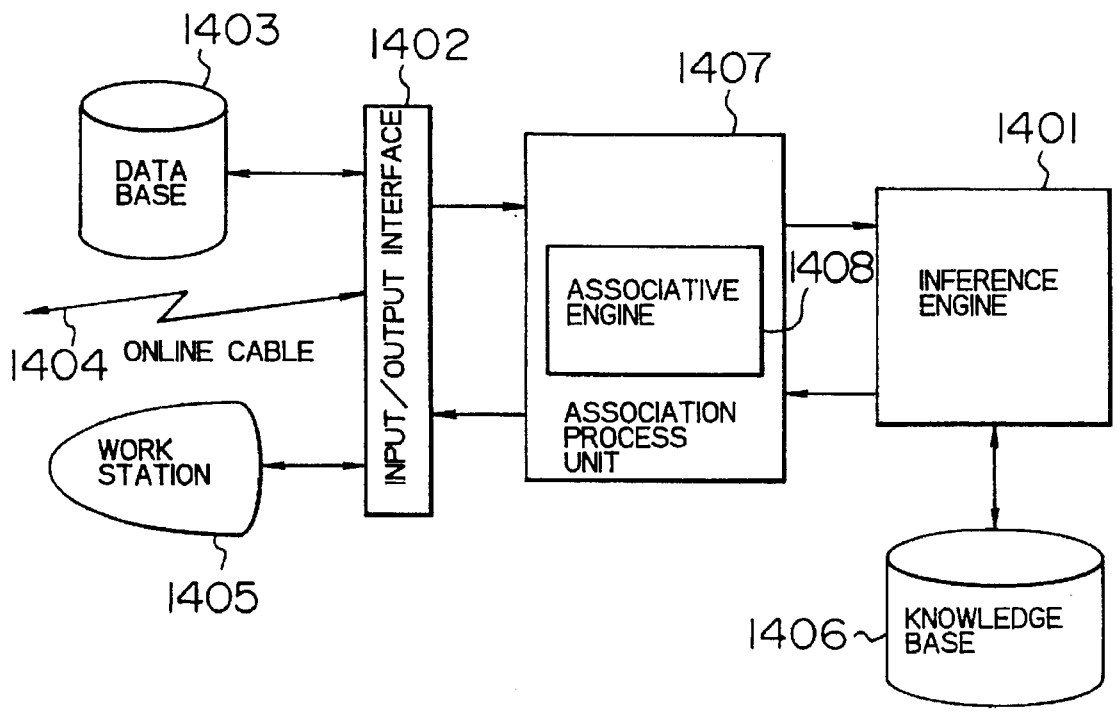
FIG. 14 is a block diagram showing the configuration of a third embodiment of the present invention.

FIG. 14 illustrates the configuration of the third embodiment of the present invention.

An inference engine 1401, an input/output interface 1402, a database 1403, an on-line cable 1404, a work station 1405, and a knowledge base 1406 are configured in the way as those of FIG. 13. The present embodiment is characterized by an association process unit 1407 disposed between the input/output interface 1402 and the inference engine 1401 for storing a great number of input data/output data sets which have been used in past inferences. The association process unit 1407 comprises an associative engine 1408 which is configured in a manner similar to the engine control unit explained in the first embodiment and the learning-type controller explained in the second embodiment of the present invention. It should be noted that the associative engine 1408 has memory cells which are all composed of externally rewritable registers for response pattern data and output data, as the RAM-type memory cell chips shown in FIG. 10 of the second embodiment.

FIG. 15 illustrates a processing flow showing the operations of the association process unit 1407.

First, at step 1501, data inputted to the input data association process unit 1407 is supplied to the associative engine 1408. The associative engine 1408 is configured, similarly to the correspondent shown in FIG. 1 or FIG. 4, such that input data is paired with and stored together with output data corresponding thereto into each memory cell, and when actually inputted data coincides with input data (response pattern data) stored in one of the memory cells, the corresponding output data is delivered from the associative engine 1408. It is assumed in the present embodiment that symbolic input data is also permitted.

FIG. 16 shows an example of a rule used in a decision support system (technical analysis support system) presented in the aforementioned literature. As shown in FIG. 16, an ordinary inference engine mainly receives pattern names such as "Bull Order" in the example of FIG. 16, i.e., symbolic inputs.

In the present embodiment, assume that respective symbolic names have been previously assigned unique numbers (which may be considered as bit patterns). In this way, symbolic data as well as numerical data can be treated in a manner similar to the first or second embodiment. It should be noted however that the distance for symbolic data is determined depending only on whether the symbols are equal or different. Therefore, the numbers have previously been subjected to an appropriate scale conversion of numerical data such that, for example, in a two-byte representation of integers, a range expressed by $\geq 0$ in 2's complement representation corresponds to numerical data, while a range expressed by $<0$ corresponds to symbolic data. Then, if the following distance calculation logic is determined for the symbolic data (for example, represented by $\underline{s}$):

$$D = d \quad \text{if} \quad s = s' \qquad (9)$$
$$= 0 \quad \text{else}$$

numerical data can be mixed with symbolic data. In the above logic, $\underline{s}$ represents input data, $\underline{s}'$ the value of corresponding response pattern data, and $\underline{d}$ ($>0$) a proper constant. Symbolic data may include items which are meaningless unless they coincide. In this case, $\underline{d}$ in the above equation may be set to a very large value such that the output of that memory cell will not be actually selected unless the symbolic data coincides.

Turning back to FIG. 15, subsequent to step 1501, an output from the associative engine 1408 is awaited at step 1502. When an output is derived from the associative engine 1408, it is determined at step 1503 whether the output is valid. When valid output data is actually delivered from the associative engine 1408, that is, when a set of response pattern data—output data matching with the input data exists in the memory cells inside the associative engine 1408, a process at step 1504 is executed, and otherwise processes at and after step 1505 are executed.

At step 1504, the output from the associative engine 1408 derived at step 1502 is delivered to the input/output interface 1402 as an output of the association process unit 1407.

At step 1505, since no valid output data was derived from the associative engine 1408, the input data is supplied to the inference engine 1401. The inference engine 1401 calculates output data based on the processing described in the aforementioned literature and so on, using knowledge stored in the knowledge base 1406.

Next, at step 1506, an output from the inference engine 1401 is received by the association process unit 1407.

At step 1507, the output data received at step 1506 is delivered from the association process unit 1407 to the input/output interface 1402. At step 1508, the current input data is stored as response pattern data together with the output data into an empty cell in the associative engine 1408. However, if the associative engine 1408 does not have an empty memory cell, the contents of the less frequently referenced memory cell or the memory cell which has not been referenced for the longest time are replaced with the current input data, as described in connection with the second embodiment.

According to the third embodiment of the present invention as described above, in a system comprising complicated knowledge processing functions, frequently appearing input data is stored together with output data corresponding thereto in the association process unit 1407 for later utilization, so that complicated knowledge processing need not be executed every time the same input data repeatedly appears, and the results can be derived at gradually increased speeds as the system is operating.

In the explanation given to the third embodiment, current input data was stored at step 1507 as it is in an empty memory cell as response pattern data. As the number of items in input data is increased, and as the number of rules stored in the knowledge base 1406 is increased, the processing executed inside the inference engine 1401 becomes more complicated. However, if the processing inside the inference engine 1401 is being monitored, it is possible to determine on which item of input data the resultant output of the inference engine 1401 depends. An example of this processing will be shown below.

As generally known, a forward reasoning using rules executes a rule which is regarded applicable based on an event currently given as a fact, adds the "then-part (conclusion part)" of the rule as a new rule, again executes the rule, and repeats these operations until a final conclusion is derived. In this event, sequential recording is performed on which rule has been executed in what order in the inference engine 1401. In this way, when a final conclusion is derived, the record can be traced in the reverse direction. Specifically, if an input data item exists in the "if-part (condition part)" of a rule finally used to derive a conclusion, this input data item is marked. If an intermediate data item generated by another rule also exists, a rule having that data item in its conclusion part can be located by tracing the record in reverse. Similarly, the condition part of that rule is also examined. By repeating this trace, minimally required input data items can be determined for deriving a final conclusion.

When items of input data on which the output depended have been determined, these input data items necessary to the determination are described in a response pattern data column of a memory cell in the associative engine 1408. Other unnecessary input data items may also be stored in the memory cell as unnecessary data items by a treatment similar to that of the don't care value in the first embodiment. In this manner, since minimally required data items only can be reserved as response pattern data for deriving output data, the possibility of one memory cell matching with input data is increased, whereby similar effects can be produced with fewer memory cells.

In the first—third embodiments described above, all the operations performed by hardware can be simulatively executed by software on a general-purpose computer. Even in this simulation, the following effects can be observed: the control accuracy is improved by the learning; the operation of the knowledge processing system becomes faster as the system is being used; and so on.

Figure 17:
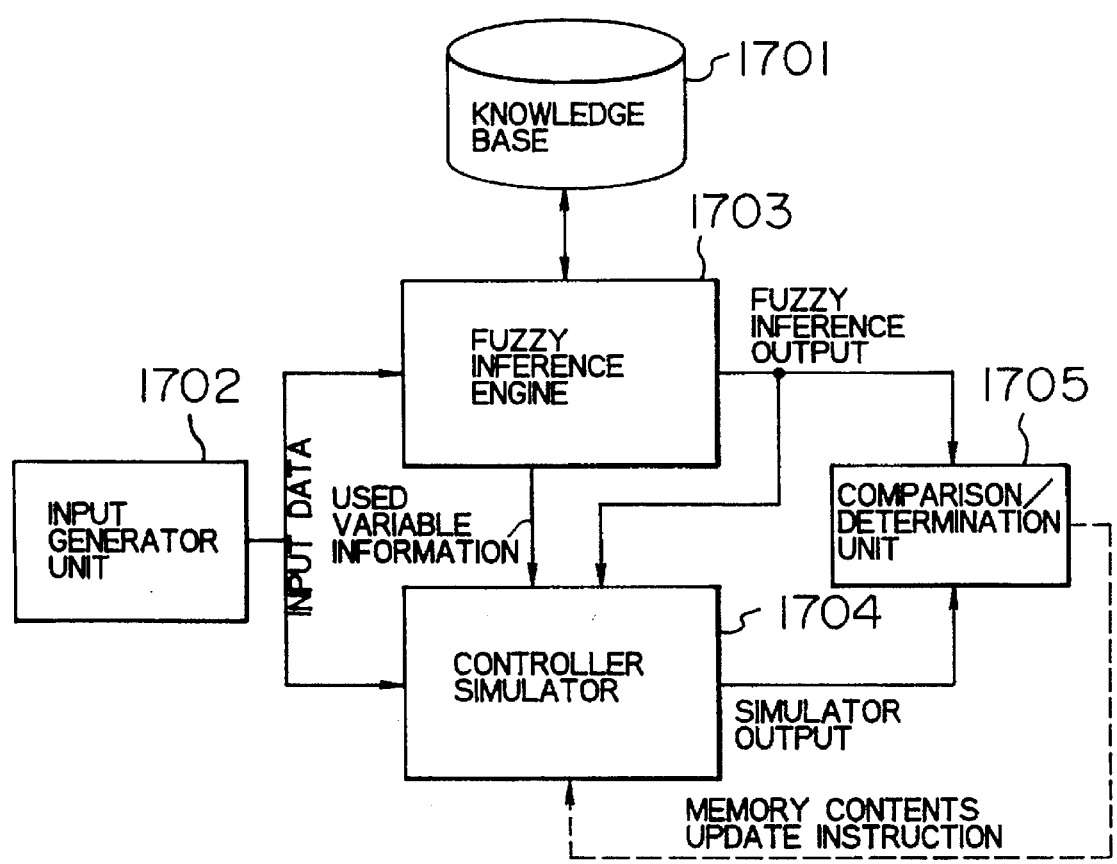
FIG. 17 is a block diagram showing the configuration of a controller designing system according to a fourth embodiment of the present invention.

FIG. 17 illustrates in block form the configuration of a controller designing system according to a fourth embodiment of the present invention. The system of this embodiment is intended to convert input/ output relations previously represented by another means such as fuzzy knowledge to sets of response pattern data—output data in the first—third embodiments. Particularly, a system using fuzzy knowledge will be explained in detail in this embodiment.

First, control knowledge empirically or partially known has previously been represented as fuzzy knowledge and stored in a fuzzy knowledge base 1701. An input generator means 1702 generates inputs to a fuzzy inference engine 1703 and a controller simulator 1704. The generator means 1702 may implement a method of completely randomly generating input values, a method of generating input values based on simulation or actually measured values of a control object, and so on. With any method employed, the operation of this system is identical.

The fuzzy inference engine 1703 calculates an output for an input value using the contents of the fuzzy knowledge base 1701.

Similarly, the controller simulator 1704 employs software to fully simulate the operations described in detail in the first—third embodiments, that is, all operations of a controller for storing sets of response pattern data—output data into memory cells and representing input/output relations, in order to calculate an output from input data. The contents of (simulated) memory cells inside the controller simulator 1704 are assumed to have previously been initialized prior to the designing of a controller. Specifically, using a memory cell management table similar to that of the second embodiment, use flags in all the memory cells are reset to place the memory cells in an unused state. In an initial input operation, since no response pattern data has been stored in any memory cell, no output value can be determined, in which case outputted is a default value previously determined by the controller simulator, for example, a special value such as "−1" (FFFF in hexadecimal representation) in two-byte representation of integers.

Outputs of the fuzzy inference engine 1703 and the controller simulator 1704 are supplied to a comparison/determination unit 1705. The comparison/determination unit 1705 calculates the difference between two sets of outputs and examines whether the difference exceeds a control tolerance which has previously been given as a design condition of a controller to be designed. When the controller simulator 1704 outputs the previously determined default value, the unit 1705 is made to always determine that the difference exceeds the control tolerance.

If the comparison/determination unit 1705 determines that the control tolerance is not exceeded, the contents of the memory cells inside the controller simulator 1704 are not updated. Then, a new input is generated by the input generator means 1702.

When determination is made that the control tolerance is exceeded, a memory contents update instruction is issued to the controller simulator 1704, and the following operations are executed.

First, in the fuzzy inference engine 1703, examination is made as to which input variable was used to determine an output. When input values are designated, for example, $x1-x10$, a change in an output value is examined when $x1$ is changed by a minute amount as expressed by $x1+\Delta x1$ (for example, when an input value is represented by eight bits, the minute amount refers to the value represented by the less significant bit). If the output value changes, $x1$ is regarded to be used in the determination of the output value. This operation is sequentially repeated until $x10$ is examined.

Next, the controller simulator 1704 designates, from among values supplied from the input generator means 1702, those which have values of variables used to determine the output in the fuzzy inference engine 1703 and unused variables represented by the don't care value as response pattern data, and the output of the fuzzy inference engine 1703 as output data. These response pattern data and output data are combined to form a set which in turn is stored as the contents of a memory cell in the controller simulator 1704. The use flag of the memory cell in which the set has been stored is set to a value indicative of a used state in the memory cell management table, in a manner similar to the second embodiment.

The above operations are repeated until a predetermined condition is satisfied. This condition is assumed to be, for example, a condition that input values are generated by the input generator means 1702 a predetermined number of times (for example 1,000,000 times) or a condition that all the memory cells in the controller simulator 1704 are being used.

With the foregoing configuration, previously given input/output relations based on fuzzy knowledge are replaced by operations of the memory cells inside the controller simulator 1704.

Of course, the contents of memory cells generated by the above configuration may be further modified in on-line/off-line manner, using the mechanism of the learning as explained in the second embodiment, to improve the control accuracy. Also, the previously given knowledge is not limited to the fuzzy. Alternatively, even if the knowledge is given as a so-called rule-base knowledge, descriptions by equations or a combination of both, the operations and effects of the present embodiment will not be affected.

According to the fourth embodiment of the present invention as described above, since knowledge previously given as empirical/partial knowledge can be replaced by operations of a controller using memory cells, the contents of the memory cells can be easily determined, and initial values in modification of the contents of the memory cells by the learning can be efficiently determined with high accuracy.

Figure 18:
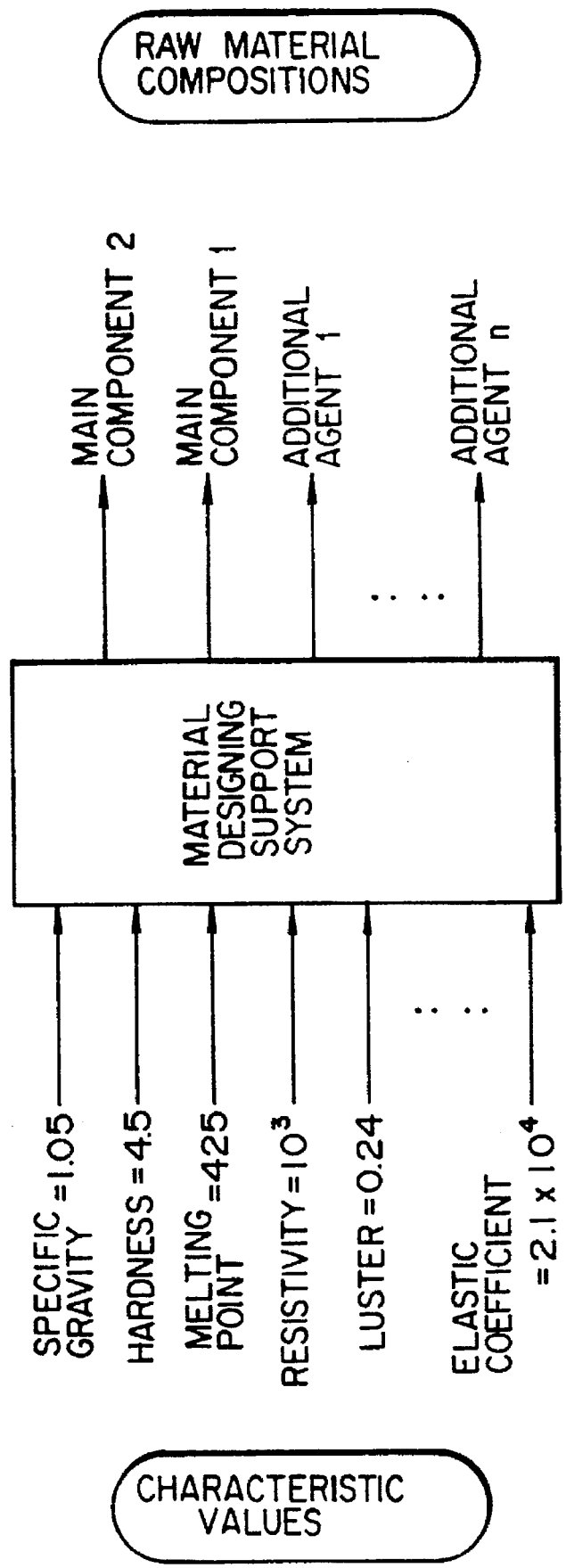
FIG. 18 is a diagram showing the configuration of a material designing support system.

FIG. 18 shows the configuration of a material designing support system for chemical products as a fifth embodiment according to the present invention. In operation, when there are specified values of such characteristics of a target chemical product such as the specific gravity, hardness, melting point, resistivity, luster, and elastic constant, the system computes the distribution ratio or composition of each raw material satisfying the requirements. Complex relationships generally exist between the characteristic values and compositions and hence it is almost impossible to construct a mathematical model. To overcome this difficulty, an attempt to obtain relationships between specified characteristic values and compositions by learning using neural networks has been described in articles such as "Material Designing Support—No. 2 System Construction", Proceedings of Information Processing Society 44th Conference (1992), pp. 221–222.

However, all necessary characteristics are not always clearly designated in the material designing. Namely, only a portion thereof may be specified and the remaining characteristics are treated as items not having particular request values, i.e., don't care values. In this case, when the neural technology is adopted like in the prior art, the neural computation is to be stopped when missing values exist in the input items. To avoid the disadvantage, there has been conventionally employed, for example, a method in which predetermined values such as mean values beforehand determined are used for the input items for which values are not requested and which are related to the missing values. This however leads to a problem. Even for input items for which values are not requested, when the pertinent input items have a strong correlation with input items for which requested values are specified, if the pertinent items are simply replaced with the predetermined values, precision of the compositions as resultant outputs is deteriorated. In the fifth embodiment of the present invention, to solve the designing problem, the method adopted in the first to fourth embodiments is applied to the problem.

Figure 19:
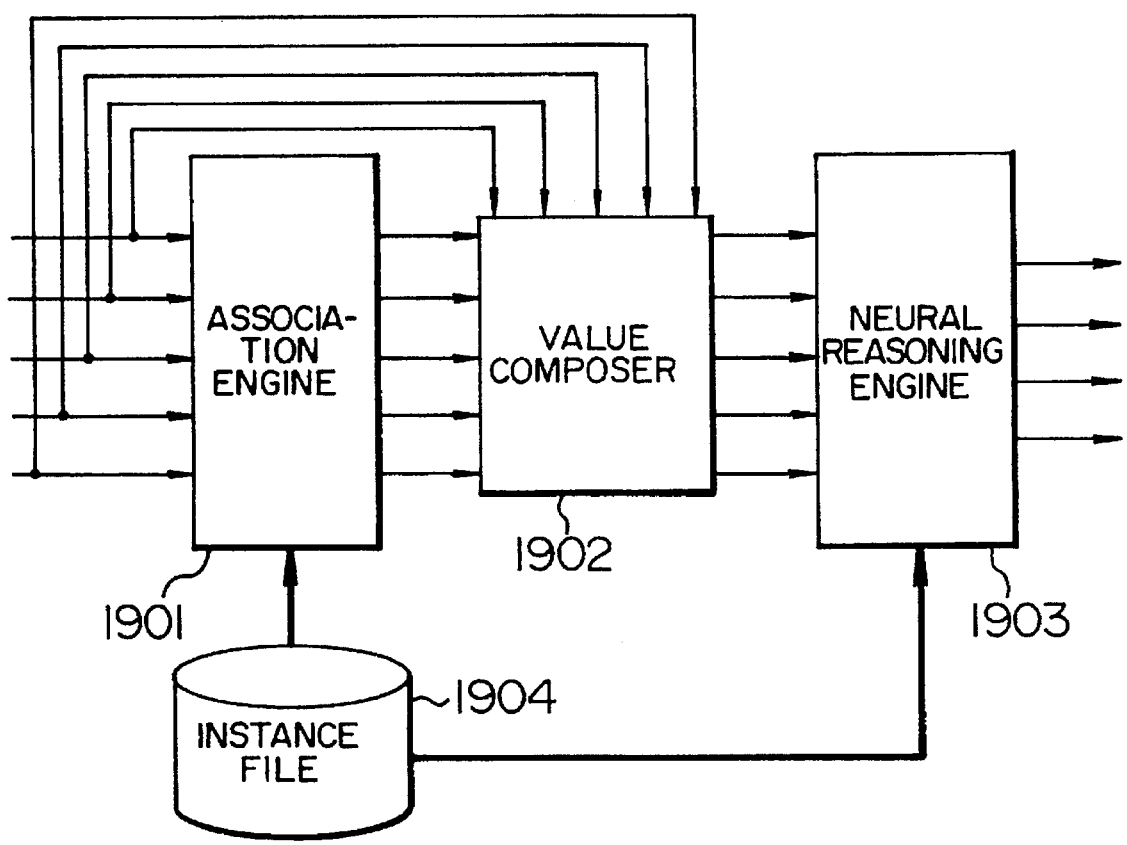
FIG. 19 is a block diagram showing the constitution of a fifth embodiment according to the present invention.

FIG. 19 shows in a block diagram the constitution of the fifth embodiment according to the present invention.

An association or associative engine 1901 receives as inputs thereto sets of request characteristic values partially including missing values and produces sets of request characteristic values free of missing values. A value composer 1902 receives the input and the output from the association engine 1901 to combine the received items with each other. In other words, the output values from the engine 1901 are set to the items corresponding to the missing input values of the engine 1901, while the input values to the engine 1901 are set to the other items. A neural reasoning or inference engine 1903 receives as an input thereto sets of request characteristic values free of missing values from the composer 1902 and outputs compositions of raw materials. An instance file 1904 stores therein sets of characteristic values in the past instances. The association engine 1901 computes the output values of request characteristics according to the instances stored in the instance file 1904.

Figure 20:
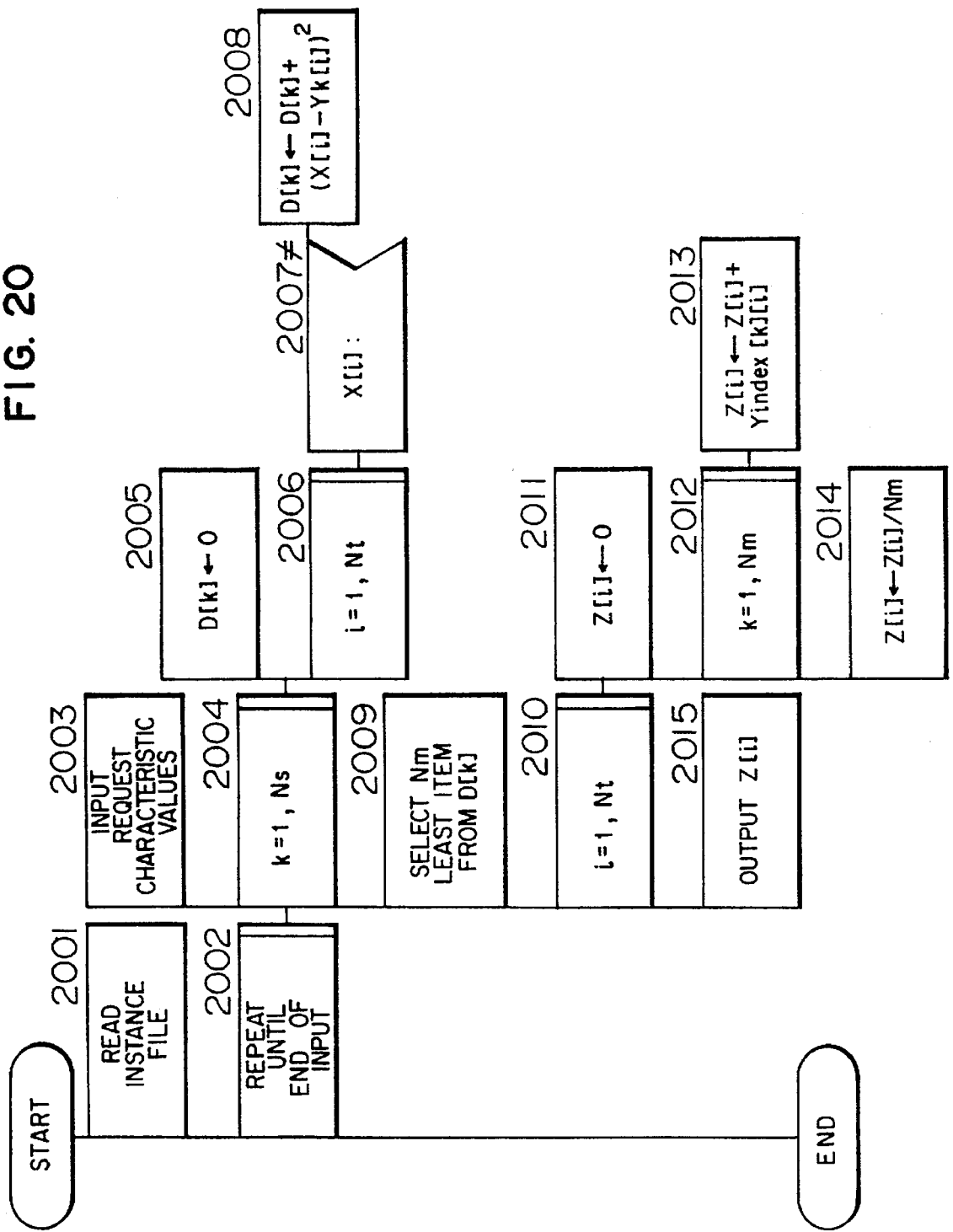
FIG. 20 is a flowchart showing a processing procedure of an association engine 1901 of FIG. 19.

FIG. 20 is a flowchart showing the processing procedure of the association engine 1901 of FIG. 19.

In step 2001, a read access is made to the file 1904 to read the contents therefrom so as to develop the contents in an array $Yk[i](k=1, 2, \ldots, Ns; i=1, 2, \ldots, Nt)$, where Ns stands for the number of instances and Nt indicates the number of items of characteristic values. $Yk[i]$ designates the values of the i-th characteristic in the k-th instance.

Step 2002 repetitiously executes a group of steps beginning at step 2003 until all inputs are processed for the request characteristic values.

In step 2003, the request characteristic values are inputted for materials as objects of the designing. The inputs are supplied by a material designer, for example, from an input device such as a keyboard. The input values are stored in an array $X[i](i=1, 2, \ldots, Nt)$. The characteristic values are represented as missing values with special symbols, for example, "*" unless otherwise specified.

Step 2004 executes a group of steps beginning at step 2005 while altering the value of variable k from 1 to Ns.

Step 2005 initializes to zero $D[k]$ to store therein the distance between $X[i]$ as an input characteristic value and the characteristic value $Yk[i]$ in each instance.

At step 2006, a group of steps beginning at step 2007 is repeatedly effected while varying the value of variable i from 1 to Nt.

At step 2007, the i-th input characteristic value $X[i]$ is checked. If the value is missing, namely, $X[i] \neq *$, step 2008 is executed.

At step 2008, $(X[i]-Yk[i])**2$ is added to the value of $D[k]$.

At step 2009, Nm (e.g., Nm=5) least values of distance values $D[k]$ computed through steps 2004 to 2008 are selected so as to store instance numbers associated therewith in an array index $[k]$ ($k=1, 2, \ldots, Nm$).

At step 2010, a series of steps beginning at step 2011 are repeatedly effected while varying the value of variable i from 1 to Nt.

Step 2011 initializes to zero the values of $Z[i]$ to store therein the output characteristic values.

At step 2012, step 2013 is repeatedly effected while varying the value of variable k from 1 to Nm.

At step 2013, $Y(index[k])[i]$ (i-th characteristic value of instance number index $[k]$) is added to the value of $Z[i]$.

At step 2014, a value obtained by dividing the value $Z[i]$ by Nm in $Z[i]$.

At step 2015, the output characteristic values $Z[i]$ calculated in the steps up to step 2014 are outputted.

Figure 21:
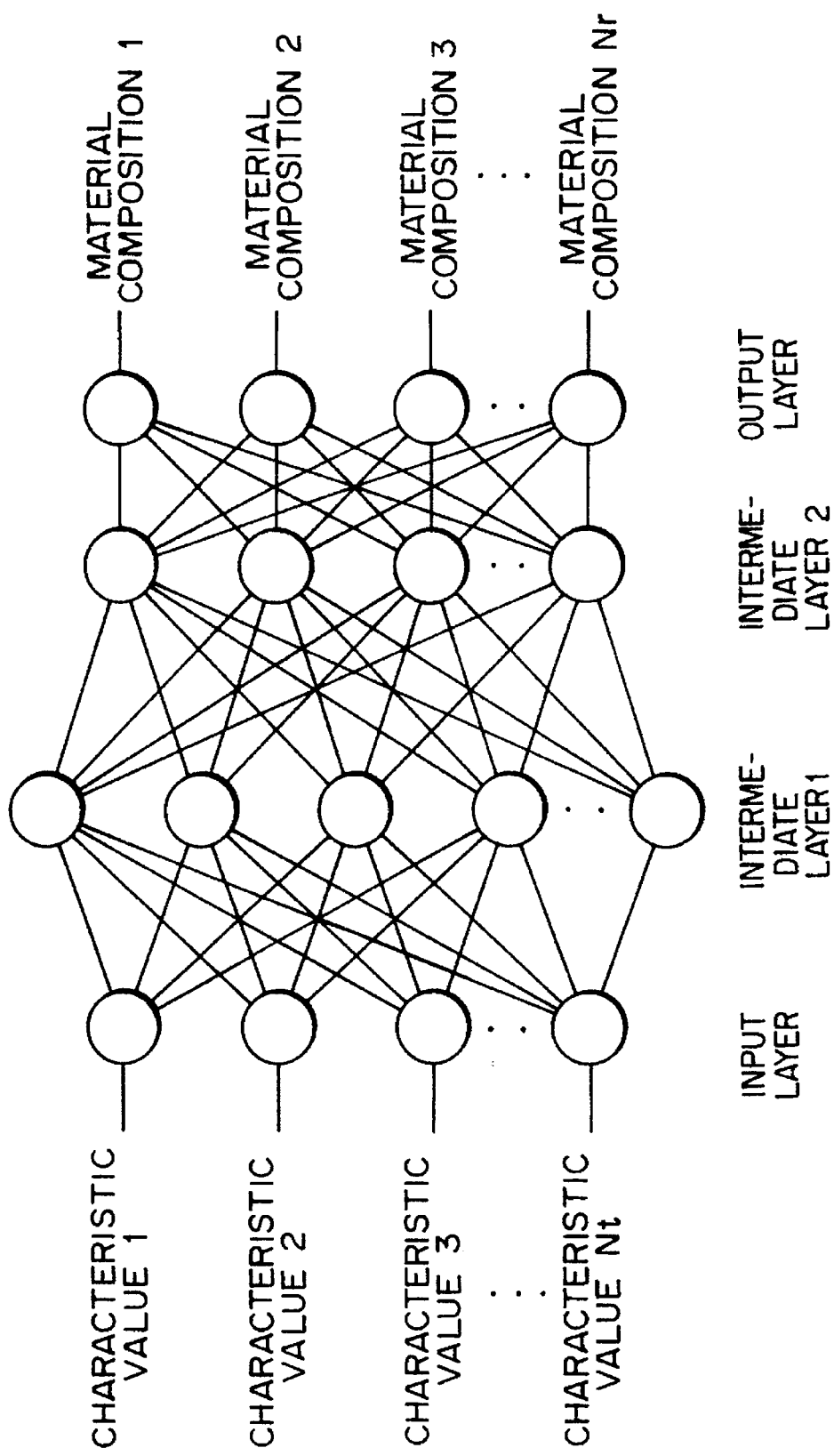
FIG. 21 is a diagram showing the construction of a neural reasoning engine of FIG. 19.

FIG. 21 shows the structure of the neural reasoning engine 1903 of FIG. 19. The neural network has four layers including an input layer 2101, a first intermediate layer 2102, a second intermediate layer 2103, and an output layer 2104. According to Nt request characteristic values, Nr material compositions are correspondingly produced.

FIG. 22 shows the configuration of the instance file 1904. Assume in the past instances that characteristic values are beforehand measured and recorded for chemical products produced according to predetermined compositions. Each instance includes a set of values of Nt characteristic values and Nr material compositions (Nt +Nr in total) and is free of missing values. At step 2001 of FIG. 20, only Nt characteristic values are obtained from the values stored in the instance file 1904.

Figure 23:
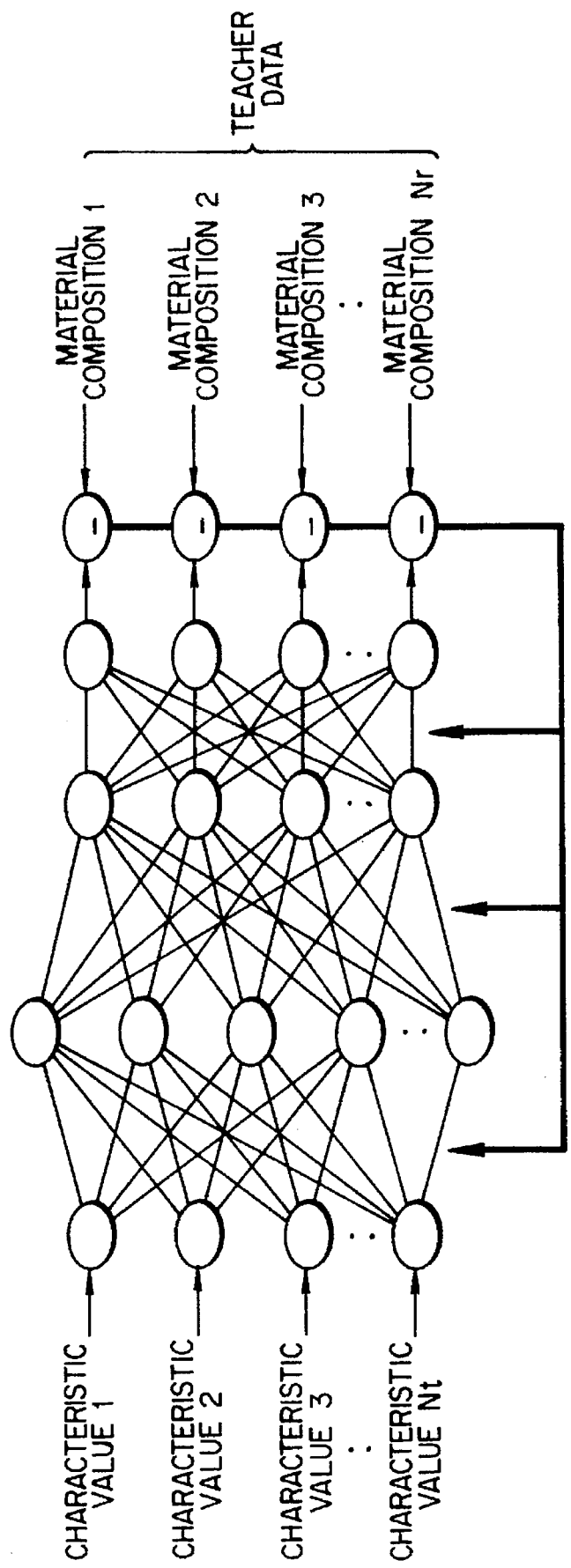
FIG. 23 is a diagram showing a method of constituting a neural reasoning engine through learning.

FIG. 23 shows the method of configuring the neural reasoning engine of FIG. 21. In FIG. 21, each link connecting the nodes to each other is assigned with a parameter called weight. The parameter is decided by a learning algorithm called an error inverse propagation method as described, for example, in the prior art 5. In the construction of this embodiment, Nt characteristic values of the respective instances stored in the instance file of FIG. 22 are inputted to the nodes of the input layer so as to compute neural outputs of FIG. 21. Outputs from the respective nodes of the output layer are respectively compared with Nr material compositions of the instances such that the weight parameter values in the neural network are adjusted to minimize each difference therebetween. This operation is repetitiously accomplished for all instances of the instance file 1904 to minimize the error, namely, until the learning converges.

With the constitution, learning of the neural reasoning engine is conducted using the instance file 1904 free of missing values. However, in a case where the actual inputs include missing values, the missing values are first complemented by the association engine 1901 adopting the instance file 1904 and are then inputted to the neural reasoning engine. Consequently, efficiently utilizing the results of learning of relationships between characteristic values and material compositions by the neural technology, there can be attained highly accurate results even in a case where the input values include missing values.

While the association engine 1901 is implemented by software shown in FIG. 20 in the fifth embodiment of the present invention, it is naturally possible to materialize the association engine employing hardware in a manner similar to that shown in FIG. 4. In this embodiment, however, since the response pattern 410 and the output data 411 is equal to each other in FIG. 4, it is possible to simplify the hardware constitution by integrating the identical data. As described in conjunction with FIG. 7, highly accurate outputs may be derived according to distance information $D[k]$, which can be easily realized by software processing like that shown in FIG. 20. Since the gist of the embodiment resides in the complementing function of input missing values by the association engine, the mechanism to attain material compositions as outputs based on the inputs, namely, request characteristic values is not limited to the neural reasoning engine as shown in FIG. 19. Namely, the mechanism may possibly be implemented by an arbitrary method using a mathematical model, a fuzzy reasoning model, and the like. Also in such a case, there can be obtained an advantageous feature like that of the embodiment.

The embodiment has been described according to an example of a material designing system for chemical products. However, in general, in a case where inputs include missing values in a control, forecast, or diagnostic system or a pattern recognition apparatus to which the neural network and the fuzzy reasoning are applicable, there can be used a method similar to that of the embodiment.

According to the fifth embodiment, in the learning of the neural reasoning engine 1903, only the instances free of missing values are used among those stored in the instance file 1904. However, when many missing values exist in the instance file, only a reduced number of instances become available for the learning of the neural reasoning engine 1903, which may cause difficulties in the learning. In a case where missing values are significant for the associated characteristic values, the precision of results of the neural learning will be deteriorated. For example, for a special chemical material, no request exists for a characteristic value of luster; consequently, the luster request values are missing in almost all instances. In this case, the fact of missing values for luster can be considered to imply information that the instance is related to the special chemical material. In this situation, when learning of the neural reasoning engine is carried out simply by using only the instances free of missing values, the learning is almost not effected for the special chemical material. In this case, even if the method of the embodiment 5 is adopted, the neural reasoning engine cannot accurately forecast or estimate the compositions related to the special chemical material, and hence performance of the overall designing support system is lowered.

To avoid the problem, the preprocessing of data may also be conducted by the association engine also in the learning by the neural reasoning engine using the inverse propagation described in conjunction with FIG. 23.

Figure 24:
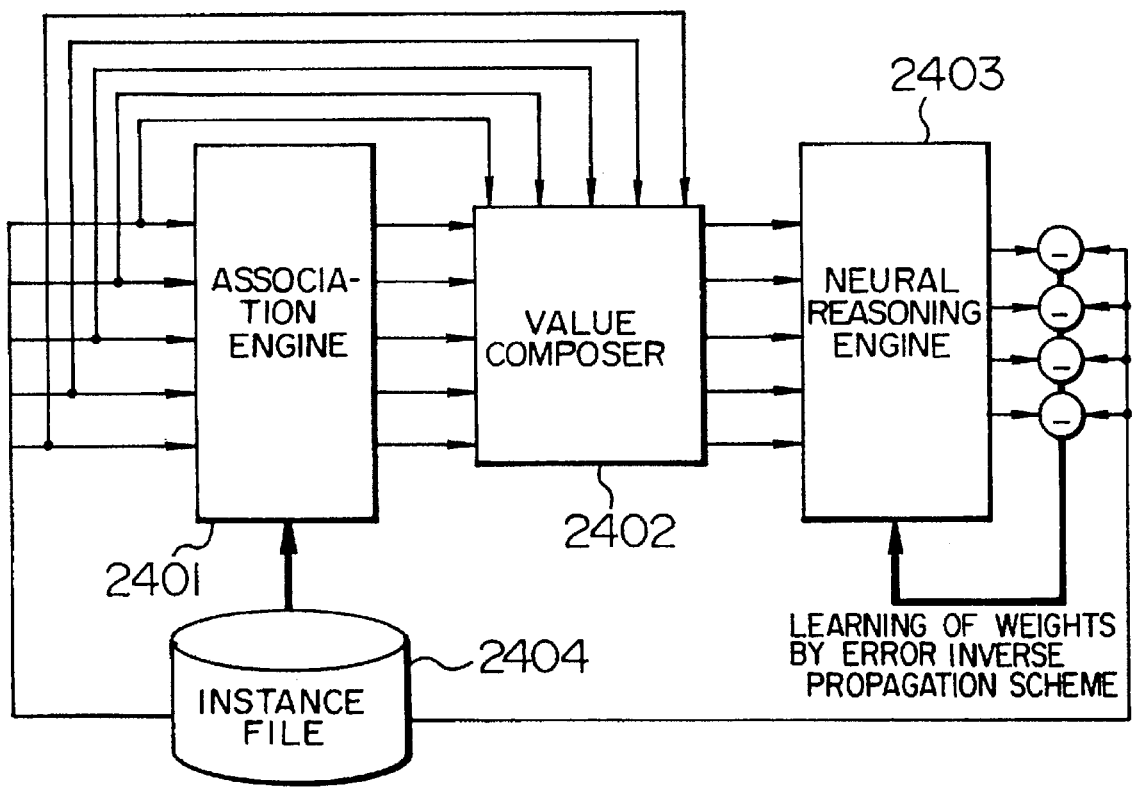
FIG. 24 is a diagram showing the construction of a learning system using an instance including missing values.

FIG. 24 shows the configuration applicable to this case. Although the constitution is effectively the same as that of FIG. 19, the complementing of missing values of data by an association engine 2401 is employed in the learning of a neural reasoning engine 2403. Operation of the association engine 2401 and a value composer 2402 are substantially identical to those respectively of the association engine 1901 and value composer 1902 of FIG. 19. According to the instances stored in the instance file 2404, the association engine 2401 complements the missing values included in the instances by use of other instances. The value composer 2402 replaces the missing values with the complemented values and then outputs the attained values to the neural reasoning engine 2403. The learning method of the neural reasoning engine 2403 is similar to that shown in FIG. 23, and the learning is conducted using as teacher data the Nr raw material compositions read from the instance file 2404.

As described above, utilizing the missing value complementing function of the association engine 2401, the embodiment advantageously facilitates the learning of the neural reasoning engine in which missing values cannot be easily processed in the prior art.

Figure 25:
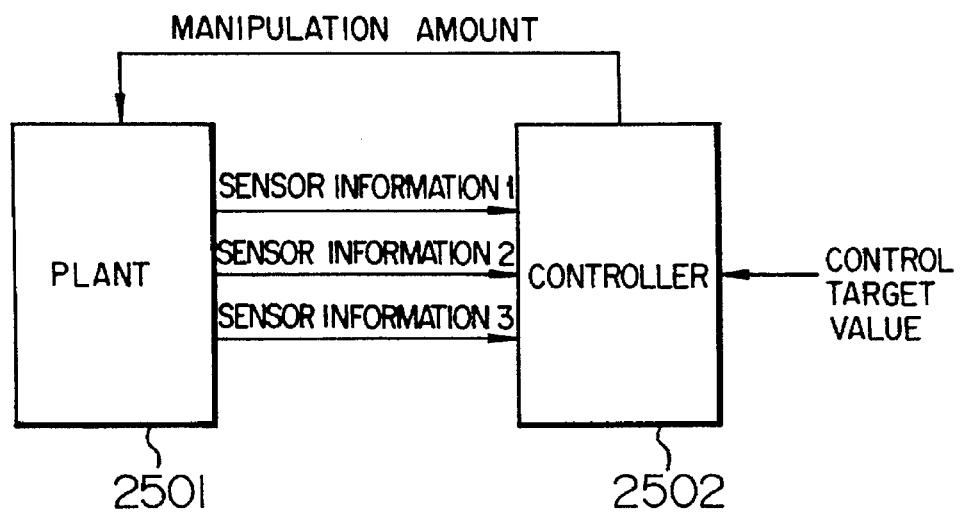
FIG. 25 is a diagram showing the structure of a plant control system.

Subsequently, description will be given of a plant monitoring apparatus as a sixth embodiment according to the present invention. FIG. 25 shows the construction of a general plant control system. Various sensors are installed in a plant 2501 as the control object. Sensor information representing states of the plant is sent to a controller 2502 at a predetermined interval of time. To minimize discrepancy between each state value of the plant and an associated target value, the controller 2502 outputs a control signal to the plant at a pertinent interval of time. Namely, receiving as inputs thereto the sensor information from the plant and the control target values, the controller 2502 produces manipulation or operation amounts to the plant. For the engine control system described in the first embodiment of the present invention, the plant 2501 and the controller 2502 respectively correspond to the engine body and the engine control unit. The configuration of FIG. 25 can be considered to be applicable to many control systems ranging from a large-sized plant control system to a control system with an integrated micro computer for family-use products.

The sixth embodiment of the present invention in which a monitoring apparatus is installed in the control system of FIG. 25 senses abnormality of the plant, a sensor, or a controller and notifies a warning message whenever an abnormality is present. For a sensor abnormality, the sixth embodiment identifies the abnormal sensor to invalidate sensor information therefrom and infers the pertinent sensor information, if possible, according to information from other sensors, thereby preventing a system failure.

Figure 26:
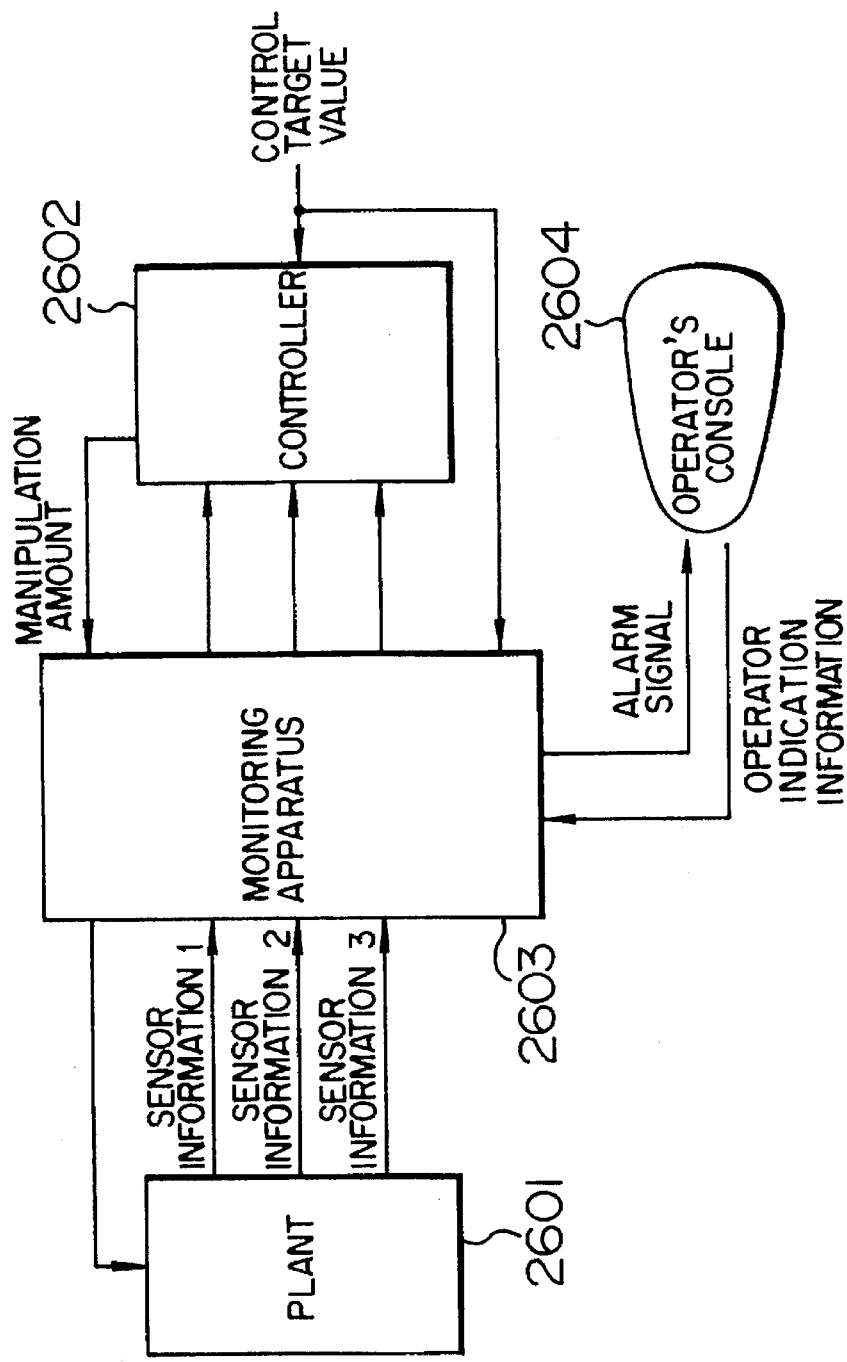
FIG. 26 is a block diagram showing the constitution of a plant monitoring system in a sixth embodiment according to the present invention.

FIG. 26 shows the configuration of a plant monitoring system in the embodiment. A plant 2601 and a controller 2602 as control objects are respectively the same as the plant 2501 and the controller 2502 of FIG. 25. A monitoring apparatus 2603 receives sensor information from the plant 2601 and control signals and control target values from the controller 2602 to monitor operation of the overall system. In an ordinary operation, the monitoring apparatus 2603 outputs the input sensor information directly to the controller 2602 and the control signals from the controller 2602 to the plant 2601 without modification thereof. Consequently, the system operation is substantially equal to that of FIG. 25. However, when an abnormality is sensed, a warning signal is transmitted to an operator's console 2604. According to an operator's instruction for the warning signal, the monitoring apparatus 2603 senses failed sensor information and estimates a failed sensor.

Figure 27:
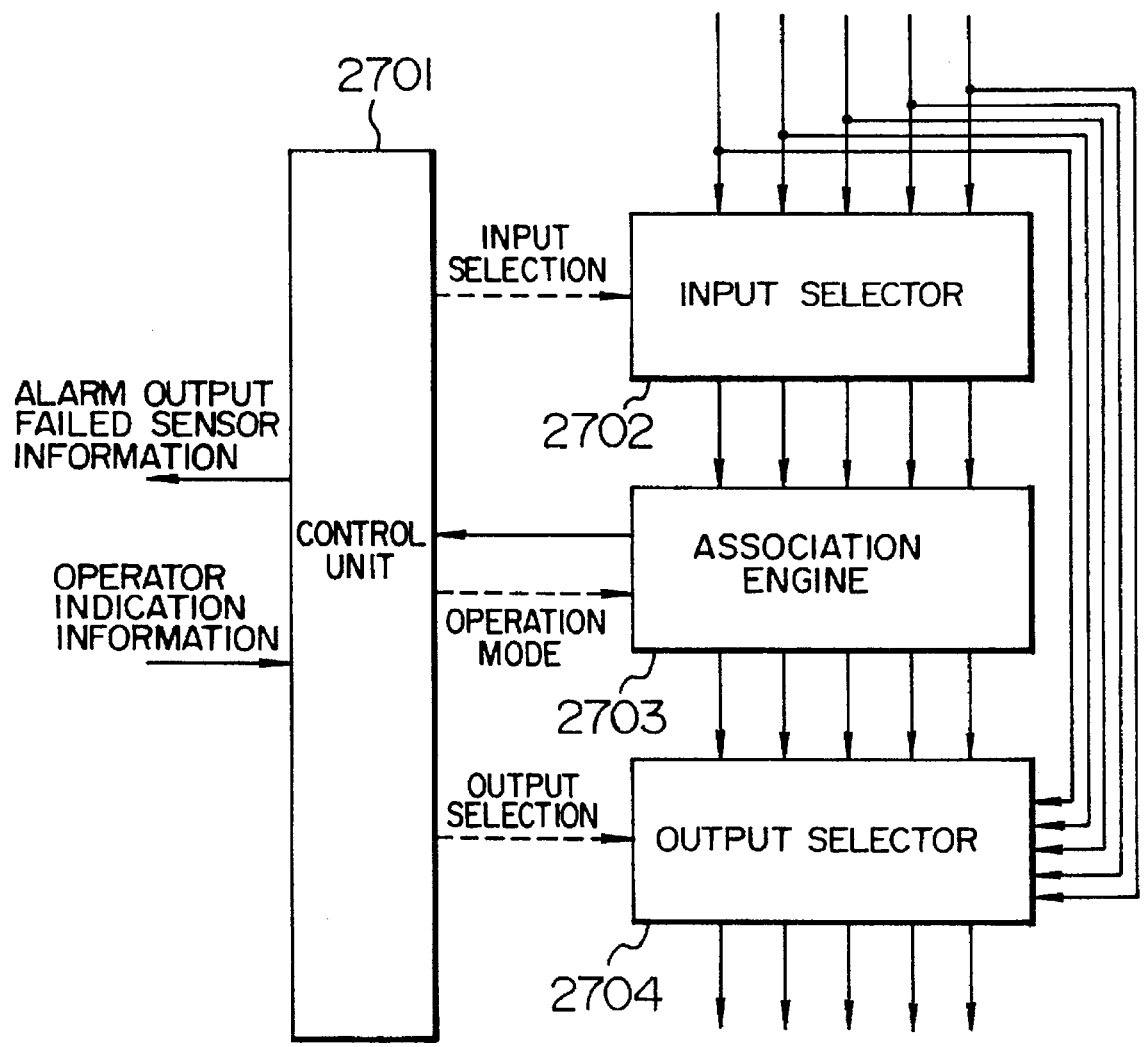
FIG. 27 is a block diagram showing the internal construction of a monitoring apparatus of FIG. 26.

FIG. 27 shows the internal construction of the monitoring apparatus 2603 of FIG. 26. The apparatus 2603 includes a control unit 2701 to control operation of the overall monitoring apparatus 2603 and to supervise input and output signals for external devices, an input selector 2702, an association engine 2703, and an output selector 2704. The association engine 2703 is configured in a similar manner as for FIG. 7 showing the first embodiment of the present invention, for example.

Figure 28:
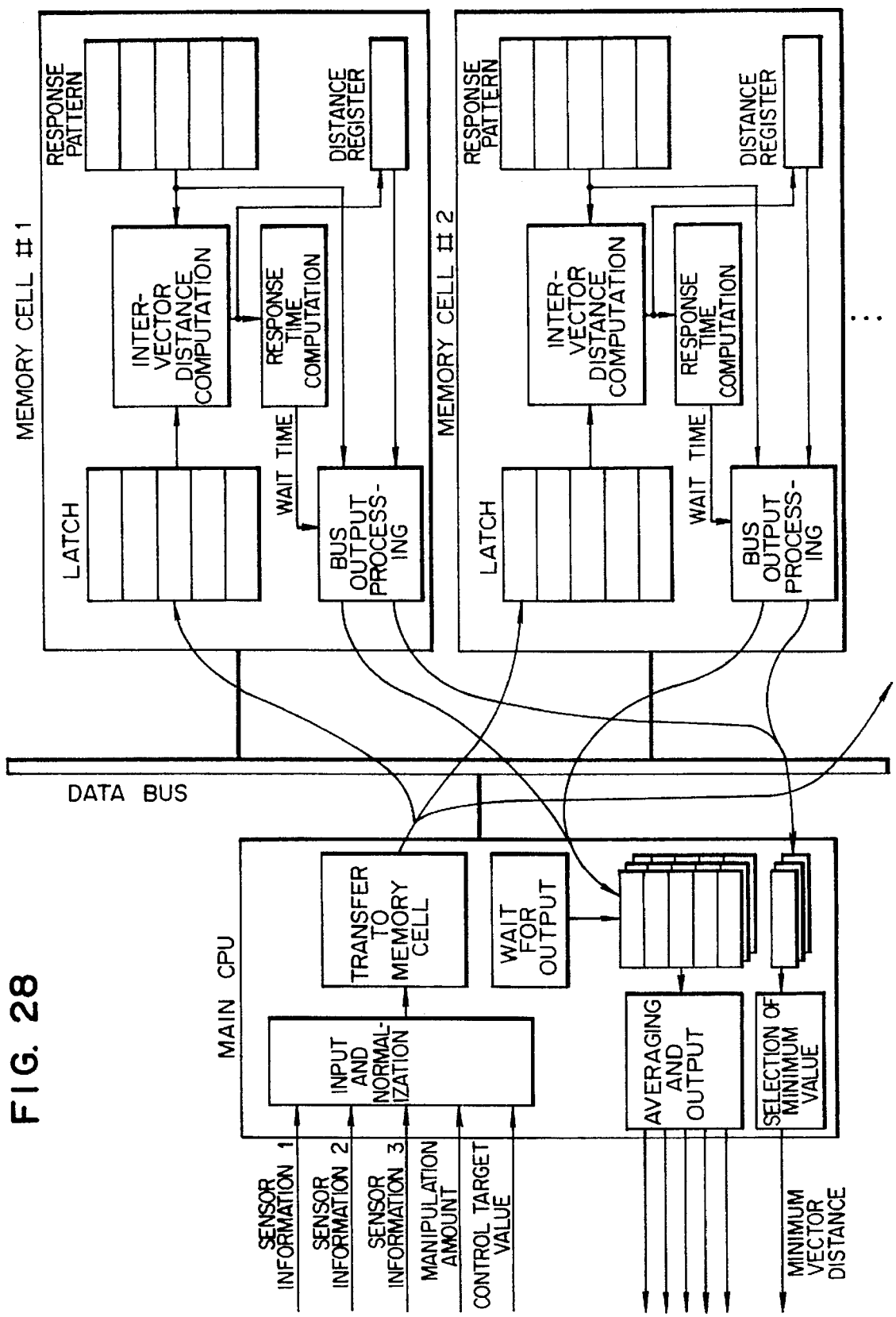
FIG. 28 is a diagram showing the internal structure of an association engine 2703 of FIG. 27.

FIG. 28 shows the constitution of the system. FIG. 28 differs from FIG. 7 as follows. In FIG. 28, the response pattern is identical to the output data and hence the output data resistor 711 of FIG. 7 is dispensed with; moreover, as the average and output processing 708, the minimum vector distance Dmin among the memory cells having issued responses is outputted. Since the response pattern registers are to be re-writable by the main CPU, each memory cell includes a RAM type memory cell chip shown in FIG. 8 presenting the second embodiment.

The monitoring apparatus 2603 operates in four operation modes including a learning mode, a monitoring mode, an abnormality identifying mode, and a correction mode. Change-over between the respective modes and control operations of the respective sections are effected by the controller 2701. Operation of each mode will be described. In the description, "operator instruction" designates indication from the operator to the monitoring apparatus 2603. For this purpose, it is assumed that there is prepared means other than those used to issue indications such as an emergency stop and a manual operation to the plant and the controller.

(1) Learning mode

When starting an abnormality monitoring operation, necessary data is accumulated to be stored in the association engine 2703 in this mode. The input selector 1602 in the learning mode outputs all inputs directly to the engine 2703. The pertinent instruction is issued from the controller 2701 to the input selector 2702. Similarly, the output selector 2704 transmits outputs from the engine 2703 as outputs from the monitoring apparatus. The engine 2703 modifies the contents of memory cells therein. The input to the monitoring apparatus 2603 is directly outputted by the output selector 2704. Operation of the association engine 2703 in the learning mode is analogous to that of the second embodiment in the learning mode.

Figure 29:
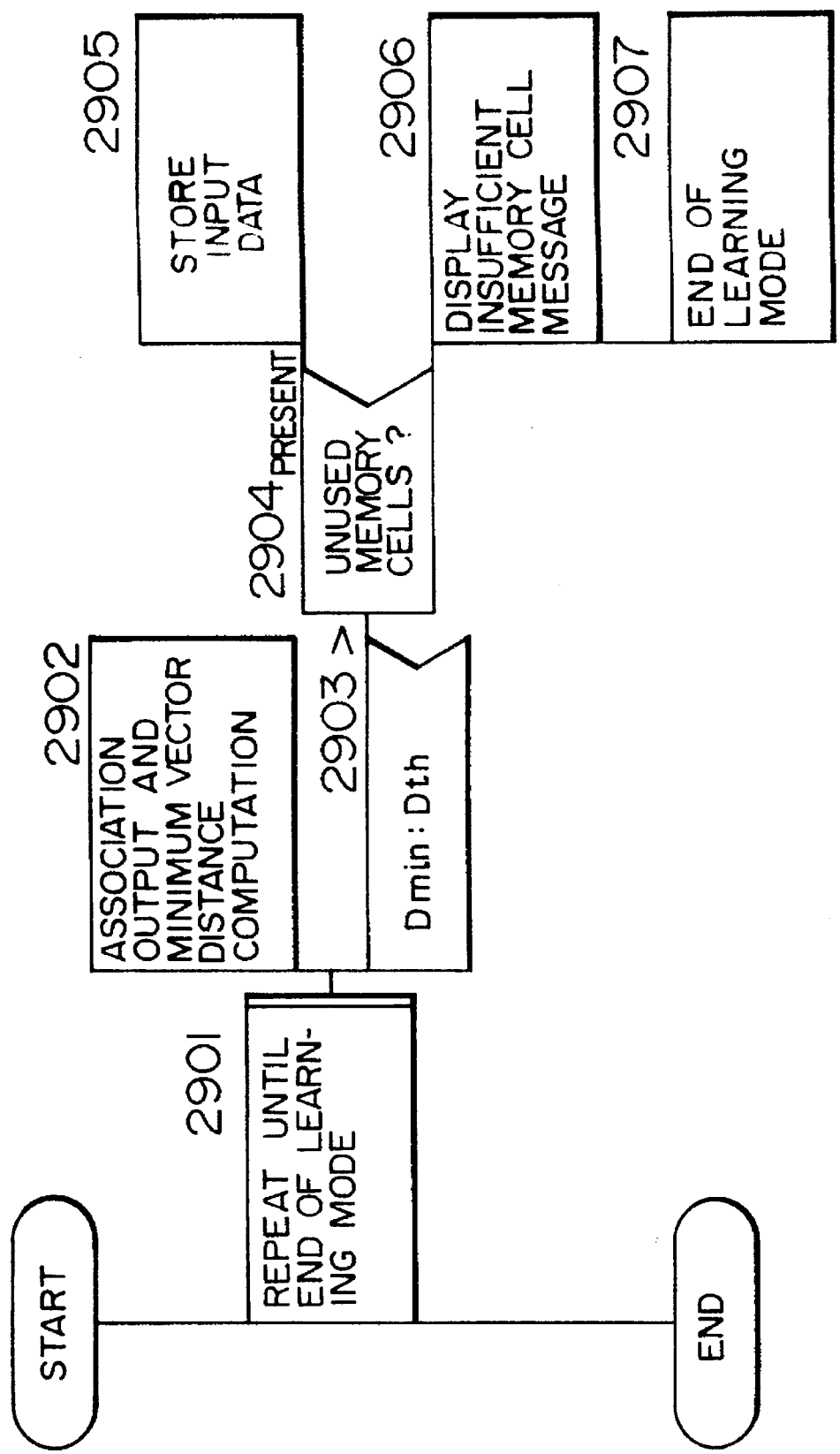
FIG. 29 is a flowchart showing a processing procedure of the monitoring apparatus in the learning mode.

FIG. 29 shows the processing flow of the operation.

In step 2901, steps 2902 and 2903 are repeatedly executed until the learning mode is finished.

In step 2902, according to data supplied in the operation of the learning mode, output data and the minimum vector distance Dmin are determined by a technique similar to that described in relation to the first embodiment.

In step 2903, the distance Dmin decided in step 2902 is compared with a preset threshold value Dth. If Dmin>Dth, control is passed to step 2904.

In step 2904, a check is made to determine whether or not unused memory cells exist. If such cells are present, control transfers to step 2905; otherwise, steps 2906 and 2907 are executed.

In step 2905, the current input data is stored in a response pattern register in the unused memory cell found in step 2904.

In step 2906, a warning message of insufficient memory cells for the learning is displayed via the control unit 2701 onto the operator's console, thereby terminating the learning processing.

The learning mode continues until a mode change instruction is issued from an external device, for example, by an operator's indication to the control unit 2701, or until there occurs an insufficient memory cell condition in step 2906. In the learning mode, the operation above is repetitiously accomplished for each input data by the associative engine 2703.

(2) Monitor mode

When the learning mode is finished and data necessary for monitoring the association engine 2703 is accumulated, the monitoring apparatus enters the monitor mode.

In the monitor mode, operations of the input and output selectors 2702 and 2704 are the same as those thereof in the learning mode. Namely, inputs to the monitoring apparatus are directly passed to the output port thereof.

The association engine 2703 executes step 2902 of FIG. 29 for the input to attain the minimum vector distance Dmin and then sends the value to the control unit 2701.

The control unit 2701 compares the distance Dmin from the engine 2703 with a threshold value Dth predetermined for the monitoring operation. If Dmin>Dth, an abnormality sense message is presented on the operator's console 2604 and then an operator's action is awaited.

In response thereto, the operator ignores the message, achieves a learning operation, or conducts an abnormality identifying operation.

When the message is ignored by the operator, the control unit 2701 ignores the message to the current input and continues processing for the next input.

When the learning operation is indicated, the association engine 2703 executes step 2904 of FIG. 29 to store the current input data in an unused memory cell.

When the abnormality identifying operation is indicated, the monitoring apparatus enters the abnormality identifying mode.

(3) Abnormality identifying mode

Figure 30:
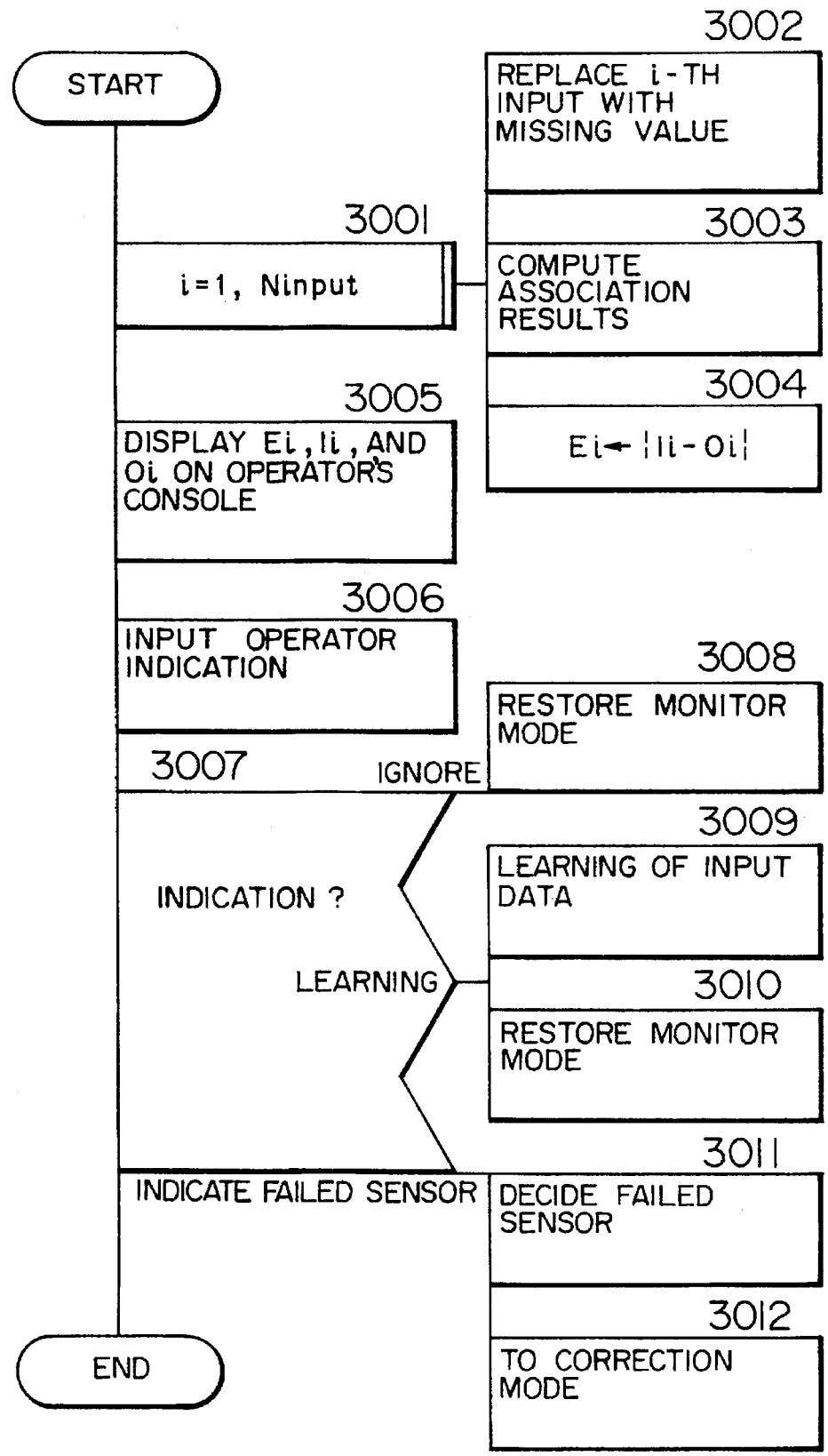
FIG. 30 is a flowchart showing a processing procedure of the monitoring apparatus in the abnormality identifying mode.

In this mode, operation is accomplished in conformity with the processing flow of FIG. 30.

In step 3001, steps 3002 to 3004 are carried out while varying the value of variable i from 1 to Ninput, where Ninput stands for the number of data items supplied to the input selector 2702.

In step 3002, the control unit 2701 instructs the input selector 2702 to substitute the i-th input sensor data for a missing value, i.e., don't care value. It is assumed that the missing value is represented by a pattern predetermined as a special value which is not used as a sensor input value.

In step 3003, the association engine 2703 executes step 2902 of FIG. 29 for data including missing values to compute average output sensor information as an association result.

In step 3004, for the i-th input sensor, there is obtained the difference $Ei=|Ii-Oi|$ between the input data value Ii and the value of mean output data Oi, where $|\cdot|$ indicates the absolute value of $\cdot$.

In step 3005, the values of Ii, Oi, and Ei resultant from steps 3001 to 3004 are displayed in an appropriate form such as a bar chart on the operator's console.

Figure 31:
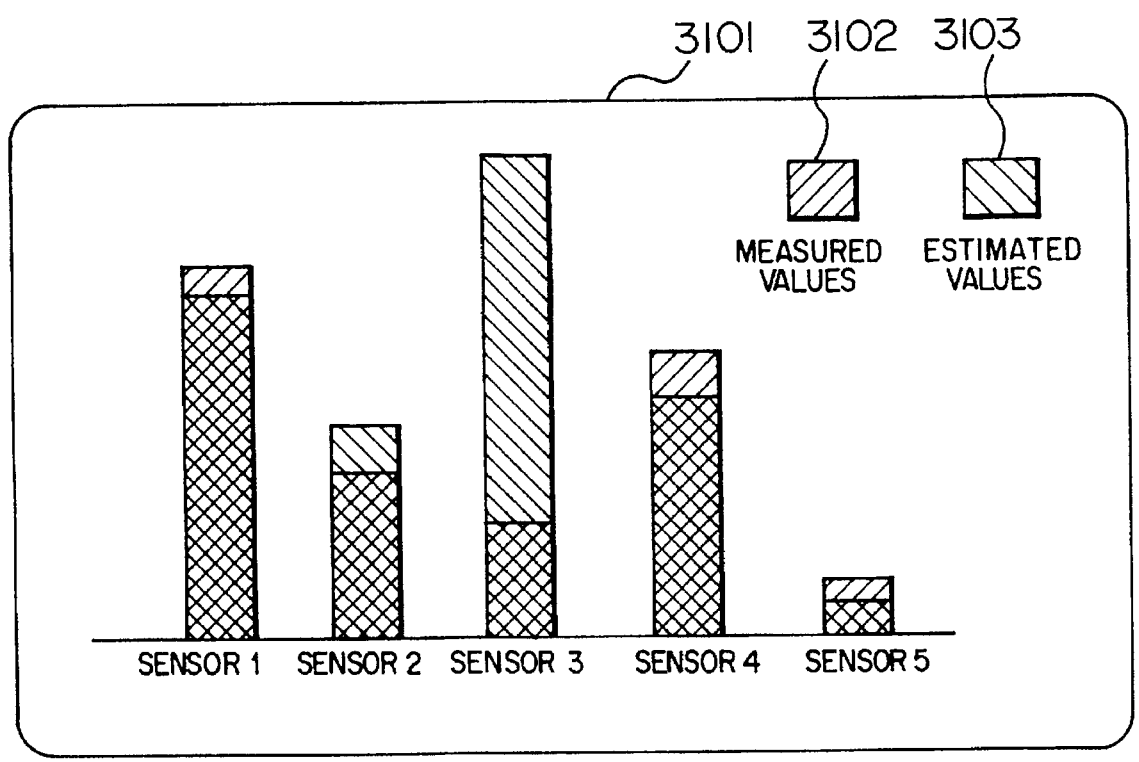
FIG. 31 is a diagram showing an example of the sensor state display on the operator's console.

FIG. 31 shows a display example on the operator's console. The measured and estimated values Ii and Oi are represented in a bar chart for each sensor. In this example, Ii and Oi are displayed in mutually different colors, which are drawn in a bar for each sensor. This facilitates determining the degree of possibility of failure for each sensor. It is naturally possible to adopt other representations, for example, the values of Ei maybe directly displayed or there may be used a broken line graph.

Step 3006 waits for an indication from the operator. The operator ignores the display, achieves a learning operation, or indicates a failed sensor. When the ignoring or learning operation is indicated, there is executed processing similar to that of the monitor mode, and then the system returns to the monitor mode. When the failed sensor indication is specified, the operator decides a failed sensor according to the displayed items on the operator's console and indicates a number or a name thereof. The monitoring apparatus then enters the correction mode.

(4) Correction mode

In the correction mode, for the sensor judged to have failed in step 3007, the control unit 2701 instructs the input selector 2702 to replace the input data with missing values. The association engine 2703 accomplishes processing similar to that of step 3003 of FIG. 30 to supply the output selector 2704 with a resultant average output. The output selector 2704 treats the output from the association engine 2703 as data associated with the failed sensor. For other data, the data inputted to the monitoring apparatus is selected to be outputted therefrom. In consequence, in this mode, data for the failed sensor is replaced by the association engine 2703 with data estimated according to information from other sensors. The other operations of the association engine 2703 are the same as those of the monitor mode; for example, when the minimum vector distance Dmin again exceeds Dth, an abnormality sense message is displayed to await an operator's indication. Namely, there is accomplished processing similar to that of FIG. 29.

Figure 32:
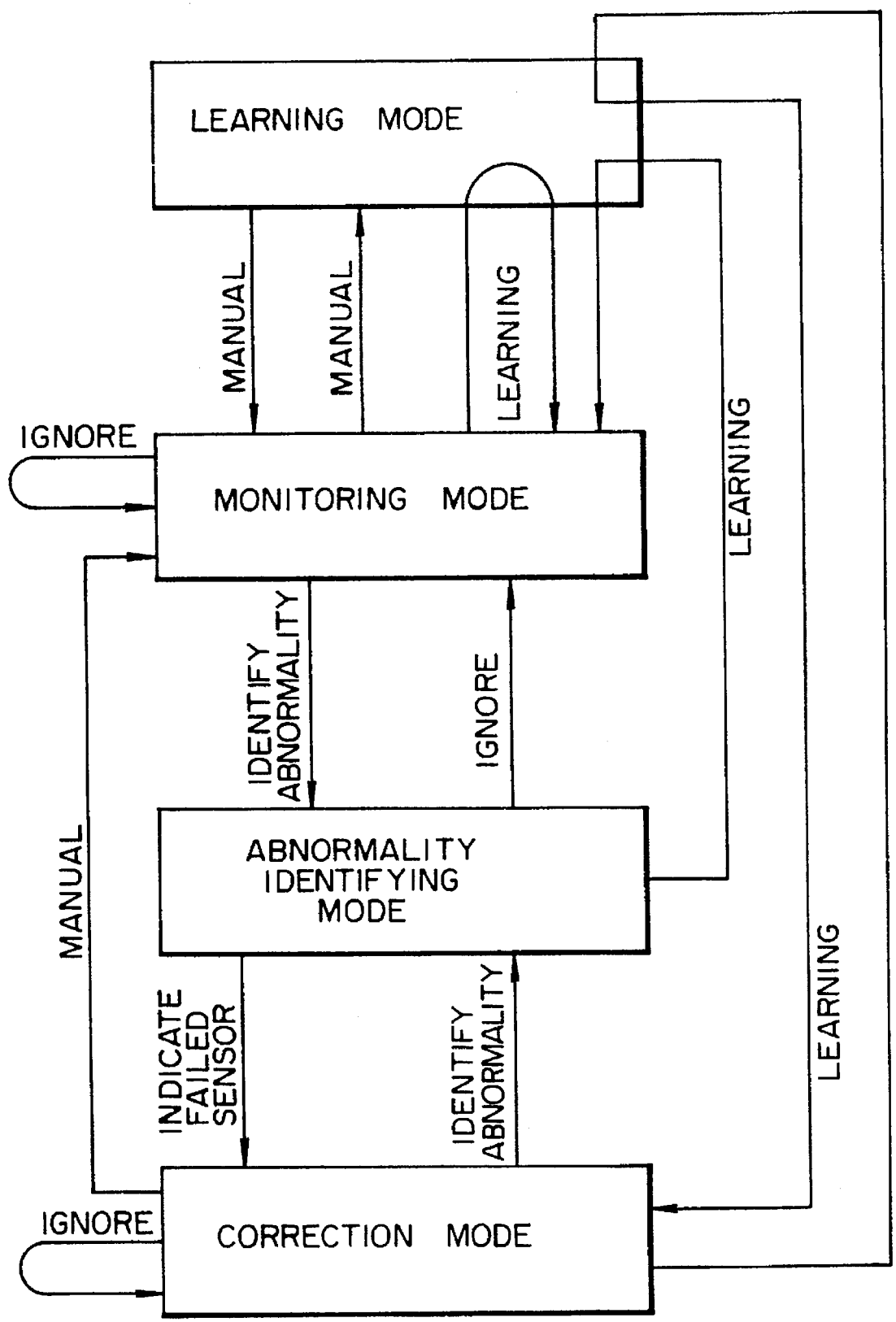
FIG. 32 is a diagram showing relationships between the operation modes of the monitoring apparatus.

FIG. 32 shows relationships between operations in the four operation modes.

In the sixth embodiment of the present invention, a system state apart from a learned state by at least a predetermined vector distance is sensed as an abnormality. Consequently, instances related to abnormal states need not be collected and hence the monitoring apparatus can be easily constructed. When an abnormality is sensed, a sensor failure and other states can be identified by the missing value complementing function of the association engine. By complementing the identified sensor information with information of the other sensors, it is advantageously possible to continue the operation without stopping the system operation. While the association engine is configured as shown in FIG. 28 in the above explanation, the equivalent function and advantageous effect can be naturally achieved by software processing like in the case of the fifth embodiment.

In the embodiments above, transition between the operation modes and decision of a failed sensor are effected entirely by the operator. In applications to the built-in control of family-use appliances, however, the above operations may also be automatically carried out (for example, assuming that the learning mode is completely finished prior to delivery of the products from the firm such that transition from the monitor mode to the abnormality identifying mode unconditionally occurs when Dmin>Dth takes place). For identification of a failed sensor, in a case where the value of Ei exceeds a preset value, the pertinent sensor is assumed to have failed so as to change the operation mode to the correction mode. As above, when the number of failed sensors exceeds two or when a sensor regarded as essential in the operation of the product fails, the failure need only be assumed as a fault of the entire product, to be notified via the display to the user. In a case when transition occurs to the correction mode, it is possible to direct the user to check the product. With the constitution, the system is much more resistive to a partial sensor failure and hence there can be advantageously achieved a stable built-in control operation with a high operation ratio.

Thus, according to the present invention, since a plurality of sets of an input and an output corresponding thereto have been prepared as sets of response pattern data—output data, and an output is determined on the basis of the sets, a complicated algorithm need not be designed on the basis of knowledge processing or mathematical control theories, making it possible to easily configure controllers, pattern recognition apparatuses, and so on.

The present invention is also advantageous in that the response pattern data can be composed of partial information of input data, so that input/output relations can be accurately represented with a smaller number of input/output sets.

The present invention is further advantageous in that the learning function is used to sequentially modify response pattern data or output data, or both of them, whereby the control or recognition accuracy can be gradually improved.

An unknown portion of the input can be complemented using the known input. Consequently, employing a neural network or the like together therewith, there is advantageously constructed a system having a higher output precision. Thanks to the similar function, instance data containing missing values can be directly used in learning of the neural network or the like. Hence, preprocessing such as data selection and work can be eliminated and time and cost necessary to configure the system is advantageously reduced. Introducing the above constitution to the monitoring apparatus makes it possible to easily construct a system to sense failures with high precision without collecting teacher data associated with states of failures.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. An information processing apparatus for obtaining a missing value portion from input data values partially containing missing values, comprising:

a plurality of storage means for storing therein sets of the input data values;

means for supplying the plural storage means with the input data values;

means for comparing, for each said storage means, current input data supplied thereto with previously input data values stored therein, and for thereby evaluating a similarity degree therebetween for each said set;

means for deriving a total result using a result of the comparison/evaluation for each said set and the stored input data;

generating means for combining the input data values with the derived total result to generate data free of missing values; and means for outputting the generated data.

2. An information processing apparatus according to claim 1, wherein said generating means includes means for replacing the missing values of the input data with values of the total result corresponding thereto to combine the input data values with the derived total result.

3. An information processing apparatus for calculating output data having at least one element from input data having a plurality of elements, comprising:

means for storing therein a plurality of sets of input data and output data;

means for generating input data free of missing values from a stored previously input data item containing missing values and at least a portion of stored current input data;

means for calculating output data from the generated input data; and means for modifying parameters included in the calculating means on the basis of a discrepancy between the stored output data and the calculated output data.

4. An information processing apparatus according to claim 2, wherein said means for calculating output data includes means for calculating the output data using a neural network.

5. An apparatus for monitoring a system including a control object, at least one measuring means for measuring states of said control object, means for supplying control target values for said control object, and a controller for determining a manipulation amount for said control object on the basis of values measured by said measuring means and the control target values, comprising:

a plurality of storage means for storing sets of at least a plurality of items of a portion of the measured values, control target values, and the manipulation amount;

means for comparing and evaluating for each said storage means a similarity degree between at least a portion of current measured values, control target values, and manipulation amount with stored previously input values;

means for attaining for each said set a minimum value of the similarity degrees having thus undergone the comparison/evaluation; and means for deciding a state of said control object from the minimum value of the obtained similarity degree.

6. A monitoring apparatus according to claim 5, wherein said comparing/evaluating means includes:

means for replacing a portion of the measured values with missing values to input resultant values to said apparatus;

means for calculating measured values free of missing values from the results of the comparison/evaluation for each said set and the stored values;

means for attaining a similarity degree between the current measured values corresponding to the values replaced with the missing values and the measured values thus calculated; and means for deciding presence or absence of abnormality in the measured values replaced with the missing values on the basis of the similarity degree.

7. A monitoring apparatus according to claim 5, wherein said comparing/evaluating means includes composing means for combining the current measured values with the measured values thus calculated and thereby obtaining corrected measured values.

8. A monitoring apparatus according to claim 6, wherein said deciding means includes means for simultaneously displaying the current measured values and the calculated measured values and thereby presenting the state of said control object.

9. A monitoring apparatus according to claim 7, wherein said composing means includes means for selecting the calculated measured values for the measured values decided as abnormal and for selecting the current measured values for measured values other than the measured values decided as abnormal, thereby combining the current measured values with the calculated measured values.

* * * * *